United States Patent [19]

Abbas et al.

[11] Patent Number: 5,467,942
[45] Date of Patent: Nov. 21, 1995

[54] TEMPERATURE SENSING OPTICAL SYSTEM

[75] Inventors: Gregory L. Abbas, Fall City; Edward J. Vertatschitsch, Bellevue; Michael de La Chapelle, Bellvue; Charles R. Porter, Redmond, all of Wash.

[73] Assignee: The Boeing Company, Seattle, Wash.

[21] Appl. No.: 130,519

[22] Filed: Oct. 1, 1993

Related U.S. Application Data

[63] Continuation-in-part of Ser. No. 752,109, Aug. 28, 1991, Pat. No. 5,294,075.

[51] Int. Cl.$^6$ .................................................. B64C 5/00
[52] U.S. Cl. ...................... 244/75 R; 244/3.17; 359/169; 359/170
[58] Field of Search .................................. 244/3.16, 3.17, 244/75 R, 175, 220, 221; 359/169, 170, 173, 109; 356/5, 6, 43, 44, 363

[56] References Cited

U.S. PATENT DOCUMENTS

| | | | |
|---|---|---|---|
| 3,900,260 | 8/1975 | Wendt | 356/5 |
| 3,932,745 | 1/1976 | Hartman | 356/6 |
| 4,203,326 | 5/1980 | Gottlieb et al. | 356/44 X |
| 4,777,660 | 10/1988 | Gould et al. | 359/169 |
| 4,777,661 | 10/1988 | Spillman, Jr. | 455/605 |
| 5,031,234 | 7/1991 | Primas et al. | 359/169 |
| 5,258,614 | 11/1993 | Kidwell et al. | 250/227.16 |

OTHER PUBLICATIONS

Breck W. Henderson, "Boeing Develops Fiber Optic Components for Future Aircraft", Aviation Week and Space Technology, May 7, 1990, pp. 84–85.

*Primary Examiner*—Margaret A. Focarino
*Assistant Examiner*—Christopher Ellis
*Attorney, Agent, or Firm*—Mark L. Fleshner

[57] ABSTRACT

An optical sensing system for sensing the temperature at a first location, including: electro-optical unit for producing a modulated optical signal and a light guide unit for receiving and transmitting the modulated optical signal along an optical path. The optical system further includes temperature sensing fiber which receives and guides the modulated optical signal along a temperature sensing optical path. One portion of the modulated optical signal serves as a reference optical signal and another portion of the modulated optical signal serves as a target optical signal. The optical sensor system also has a transducing unit, which receives the reference optical signal, the target optical signal having first and second time delays with respect to a chirped rf signal from the electro-optical unit. The transducing unit produces a multi-frequency electrical signal which includes a first frequency corresponding to the first time delay a second frequency corresponding to the second time delay. The optical sensor system further has a temperature detecting means coupled to the output of the transducing unit which processes the multi-frequency signal and determines a difference frequency corresponding to the temperature at the first location.

23 Claims, 27 Drawing Sheets

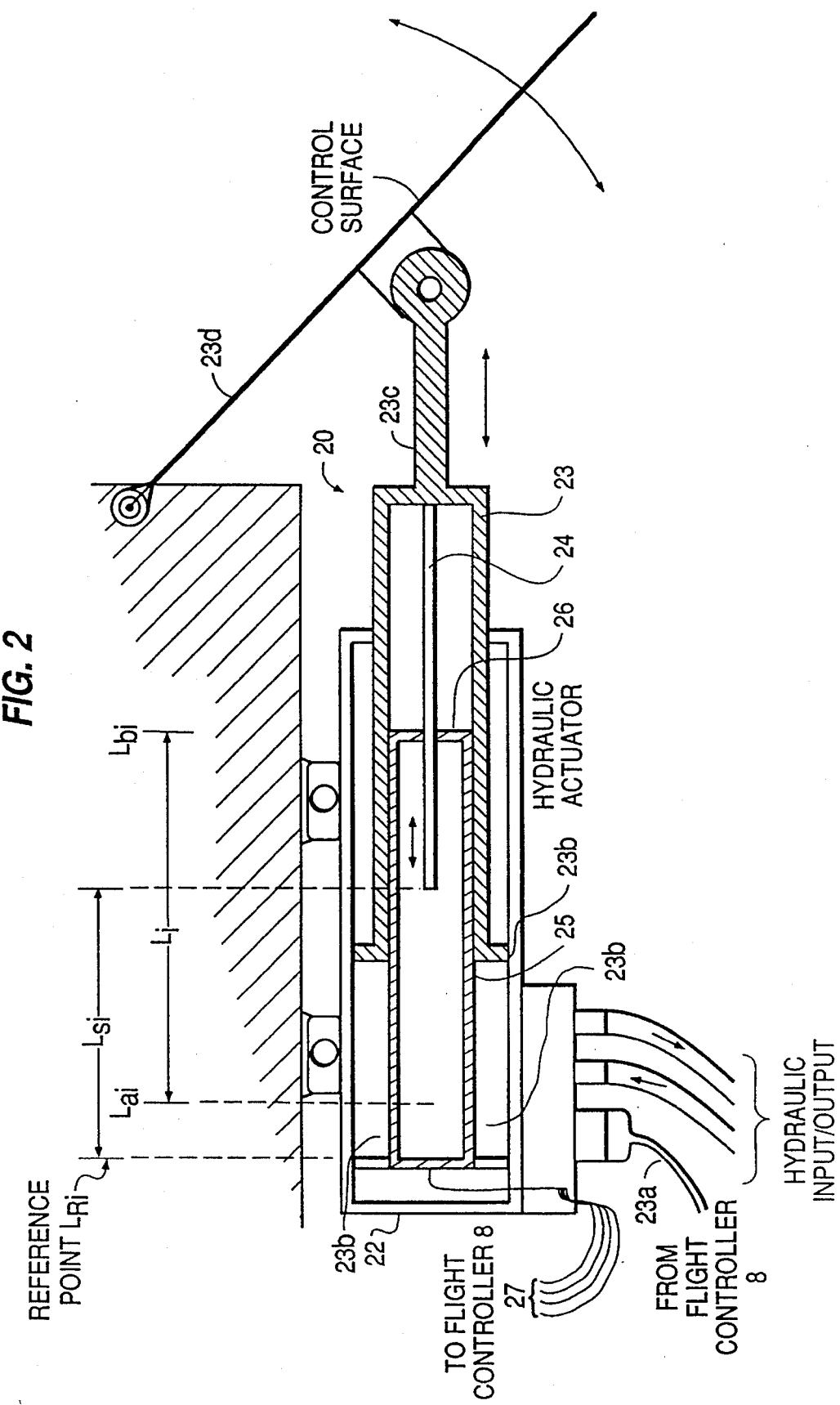

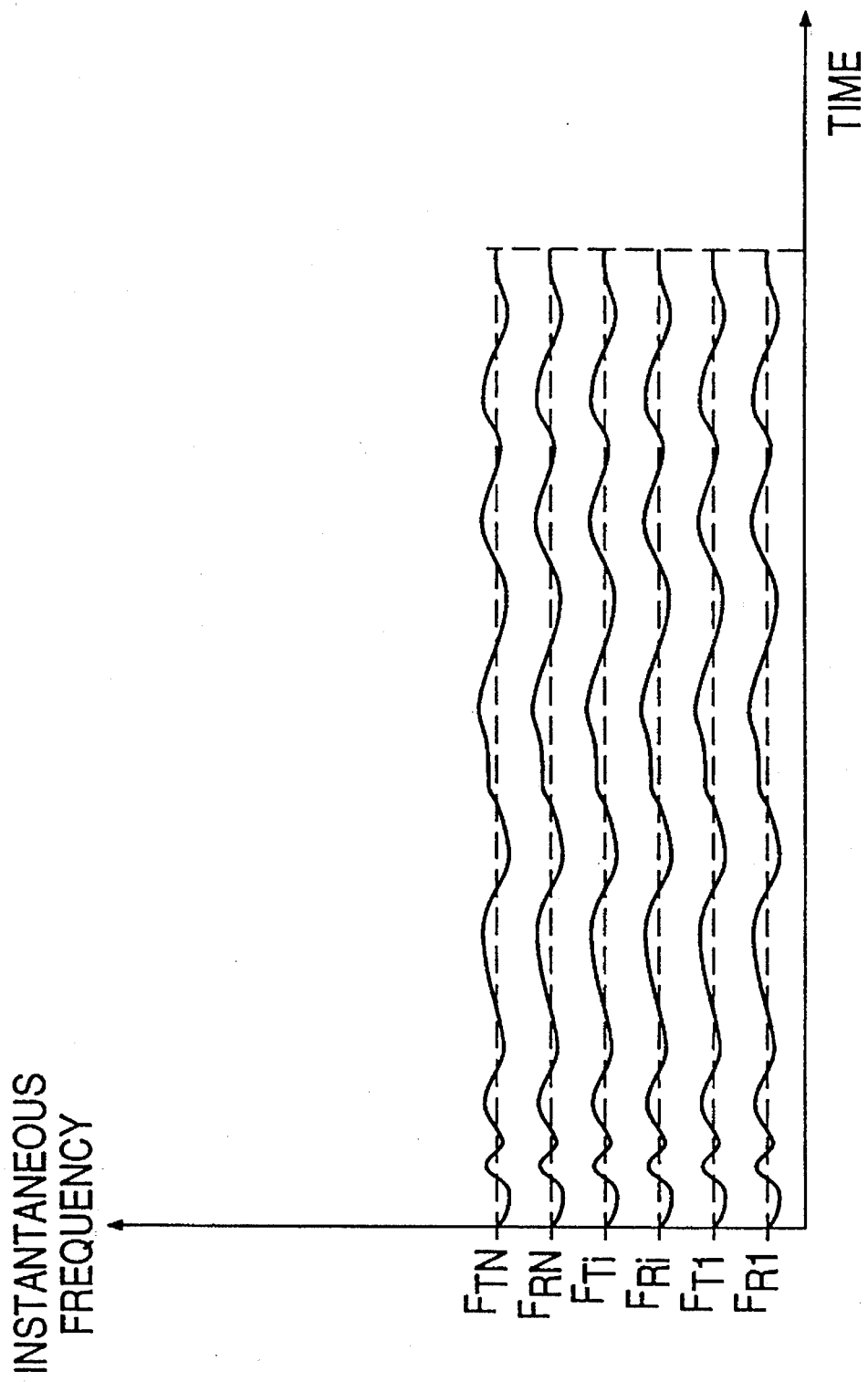

TEMPERATURE SENSING OPTICAL SYSTEM

CROSS REFERENCE TO RELATED APPLICATIONS

This is a continuation-in-part of Ser. No. 07/752,109, filed Aug. 28th, 1991, the disclosure of which is incorporated herein by reference.

BACKGROUND OF THE INVENTION

1. Field of the Invention

This invention relates generally to an apparatus and method for sensing physical phenomena and particularly to an optical temperature and position sensing system for detecting temperatures at various locations while measuring position of one or more displaceable elements. Still more particularly, the invention relates to a high accuracy light radar, fiber optic temperature sensing system for use on an aircraft in order to measure temperatures at various locations on the aircraft while simultaneously measuring the positions of various moving parts of the aircraft at high rates and with short lag times.

2. Background of the Related Art

Traditionally, electrical sensors are used to measure the temperature at various locations on an aircraft. Results of all of these measurements are then fed back to a system flight controller which processes this information and outputs appropriate commands to control the actuators.

While this is taking place, position measurements are also being made. A typical actuator has a rod secured within an outer casing. Depending on the actuator, the rod can move back and forth a maximum distance of a few millimeters to over 50 cm. This maximum distance is often referred to as a stroke. A sensor head associated with the actuator sends a position signal representing the position of the actuator rod to a processor that calculates a position measurement. Position measurements of the rod must be fed to the flight controller at rates up to several hundred Hz, with a lag time less than 0.5 ms, and accuracies of a few hundred micrometers.

Fiber optic sensing systems offer numerous advantages over conventional electrical sensing systems for measuring temperatures and positions. First, they are small and lightweight. In addition, they can be made immune from electromagnetic interference (EMI) which can occur near power lines, and electromagnetic pulses (EMP) which can occur in the event of a nuclear explosion. EMI/EMP immunity is an especially important advantage for new generation aircraft which have skins made largely of composite (non-metallic, non-shielding) material. Without heavy, bulky and expensive shielding of conventional electrical sensors and control lines, these next generation aircraft can not be safely flown in areas of severe EMI/EMP. Therefore, "fly-by-light" systems or fiber optic position sensing systems have the potential to replace "fly-by-wire" systems in future aircraft.

One method for fiber-optic temperature sensing is an interferometric optical system as shown in FIG. 1a. There, a laser 700 is coupled to an optical fiber 710 which guides laser radiation from laser 700 to sensor head 720. Sensor head 720 has a fiber optic coupler 730A which provides two optical paths (fibers), namely, a sensing arm 740 and a reference arm 750. Part of the laser radiation travels through sensing arm 740 while another part of the radiation travels through reference arm 750. Sensing arm 740 is wrapped around an object 744 which expands or contracts and in turn causes the optical path length of sensing arm 740 to increase or decrease depending on the temperature at sensor head 720. Laser radiation from sensing arm 740 and reference arm 750 is recombined at coupler 730B and then travels along return fiber 750 to detector 760. Since laser radiation from laser 700 experiences two different delays depending on the difference in relative optical path lengths of sensing arm 740 and reference arm 750, interference fringes are produced at photodetector 760. A fringe counter 770 such as a zero counter then counts the number of fringes at photodetector 760 and this number of fringes is used to estimate temperature changes.

This approach to measuring temperature has numerous disadvantages. First, it can only measure relative temperature variations, i.e., it cannot distinguish between increasing or decreasing temperature. Also, it requires two fibers—transmit fiber 710 and return fiber 750. In addition, it requires single mode, polarization preserving fiber and a coherent laser source. Further, it cannot be multiplexed, e.g., a single photodetector cannot be used to measure temperatures at multiple locations. Also, it cannot receive and process optical signals from both temperature sensor heads and position sensor heads.

Just as other fiber optic temperature sensing systems cannot multiplex temperature sensors with position sensors, other fiber optic position sensing systems cannot multiplex position sensors with temperature sensors. For example, some fiber optic position sensing systems use digital or optical encoding techniques in order to vary the amplitude of an incident optical signal as a surface is moved. However, multiplexing position sensor heads alone in these types of sensor systems is costly and complex, resulting in a heavy, voluminous sensing system which still cannot simultaneously multiplex both temperature and position sensor heads.

Another type of fiber optic position sensor system sometimes called an optical time domain reflectometer (OTDR) uses a pulsed optical source. In particular, OTDRs measure distances to in-line fiber reflectors by estimating the round trip transit time of a light pulse from the pulsed optical source to the in-line fiber reflector and back to a detector. Both the measurement accuracy and estimation times are fundamentally limited by the amplitude and width of the light pulse. It is also difficult to multiplex only position sensor heads in OTDR systems.

Yet another type of fiber optic position sensor system is a coherent optical frequency domain reflectometer (COFDR). COFDRs use coherent frequency modulated (FM) optical radiation. However, optical sources used in the COFDR must have narrow line widths and therefore tend to have low output power and low reliability. Also, as with the interferometer approach to measuring temperature, COFDRs require single mode, polarization preserving fibers in order to coherently optically mix returned optical signals with an optical local oscillator signal. Consequently, COFDRs are difficult to install and maintain. In addition, each temperature sensor heads requires two fibers, one serving as a temperature sensing arm and the other as a reference arm even further complicating the system.

SUMMARY OF THE INVENTION

An object of the invention therefore is to provide an optical sensing system capable of simultaneously obtaining absolute temperature measurements from various locations.

Another object of the invention is to provide an optical sensing system capable of multiplexing a plurality of temperature sensor heads with a plurality of position sensor heads.

Another object of the invention is to provide an optical sensing system to be used on an aircraft with a controller which controls flight of the aircraft.

Another object of the invention is to provide an optical sensing system with passive sensor heads and easy to shield active electronics, thereby making the sensing system relatively immune to EMI and EMP.

Another object of the invention is to provide an optical sensing system which uses a single fiber to lead to the temperature sensor head rather than both a sensing fiber and a reference fiber. An advantage of the system is that it can simultaneously obtain a plurality of temperature and position measurements.

Another advantage of the invention is it can be made immune to EMI and EMP disturbances.

A feature of the invention is that it uses passive sensor heads.

Another feature of the invention is that a target and a reference signal are used to measure position of a target reflector.

Another feature of the invention is that a ramped RF source is used to intensity modulate a light source.

Another feature of the invention is that it can use multimode optical fibers.

Another feature of the invention is that temperature and position measurements are updated using a tracker.

Another feature of the invention is that a single optical fiber can be used at the sensor head to transmit and receive an optical signal.

The above and other objects, advantages and features are accomplished in accordance with the invention by the provision of an optical sensing system for sensing the temperature at a first location, including: electro-optical means for outputting a modulated optical signal and a chirped rf signal, the envelope of the modulated optical signal having a phase that has a known relation to the phase of the chirped rf signal, and a light guide means coupled to the elector-optical means for receiving and transmitting the modulated optical signal along an optical path. The optical system further includes temperature sensing fiber optically coupled to the light guide means and having a first end and a second end, the first end having an associated reference reflector and the second end having an associated target reflector. The temperature sensing fiber receives the modulated optical signal at the first end and guides the modulated optical signal along a temperature sensing optical path within the first and second ends, wherein the reference reflector reflects a portion of the modulated optical signal as a reference optical signal and the target reflector reflects a portion of the modulated optical signal as a target optical signal. The optical sensor system also has transducing means, having an output and two inputs and coupled to the temperature sensing optical fiber. One of the two inputs of the transducing means is electrically coupled to the electro-optical means for receiving the chirped rf signal and the other of the two inputs is optically coupled to the light guide means. The transducing means receives the reference optical signal and the target optical signal having first and second time delays with respect to the chirped rf signal, respectively. The transducing means produces a multi-frequency electrical signal at its output which includes a first frequency corresponding to the first time delay a second frequency corresponding to the second time delay. The optical sensor system also has temperature detecting means coupled to the output of the transducing means for processing the multi-frequency signal and determining a difference frequency corresponding to the difference between the first frequency and the second frequency and representing the temperature at the first location.

The above objects, advantages and features are further accomplished in accordance with the invention by the provision of a temperature sensitive object, wherein the temperature sensing fiber is attached to the temperature sensitive object at first and second attachment locations so that a change in the temperature at the first location causes the second time delay to vary in accordance with variations in size of the temperature sensitive object.

Alternatively, the above objects, advantages and features are further accomplished in accordance with the invention by the provision of a temperature sensing fiber which is coated with a temperature sensitive material.

Yet another alternative accomplishes the above objects, advantages and features by the provision of a retro-reflector on a bi-metallic strip, wherein the shape of the bi-metal is temperature dependent.

The above objects, advantages and features are further accomplished in accordance with the invention by the provision of a plurality of temperature sensing fibers including the temperature sensing fibers and other temperature sensing fibers. The plurality of temperature sensing fibers are arranged at a plurality of locations including the first location and are coupled to the optical coupling means, wherein the multi-frequency electrical signal output by the transducing means includes a plurality of pairs of first and second frequencies, and the temperature detecting means determines a plurality of difference frequencies from the multi-frequency electrical signal, each difference frequency corresponding to the difference between the first and second frequencies of a respective pair of first and second frequencies and each difference frequency representing the temperature at a respective one of the plurality of locations.

The above and other objects, advantages and features are further accomplished in an aircraft which has a flight controller for controlling flight of the aircraft in accordance with the invention by the provision of a combination including: electro-optical means for outputting a modulated optical signal and a chirped rf signal, the envelope of the modulated optical signal having a phase that has a known relation to the phase of the chirped rf signal and light guide means coupled to the electro-optical means for receiving and transmitting the modulated optical signal along a plurality of optical paths. The combination further includes a plurality of temperature sensor heads arranged at a plurality of locations and a plurality of position sensor heads, each temperature sensor head having a temperature sensing fiber and each position sensor head having a displaceable object, one of the plurality of temperature sensor heads and position sensor heads being disposed in one of the plurality of optical paths, wherein each temperature sensor head receives the modulated optical signal and provides a respective temperature target optical signal and temperature reference optical signal, and each position sensor head receives the modulated optical signal and provides a respective position target optical signal and position reference optical signal. The combination includes position and temperature detecting means having an input optically coupled to the light guide means and having another input electrically coupled to the electro-optical means for receiving the chirped rf signal at the another input and for receiving the position target optical signals and position reference optical signals as well as the temperature target optical signals and temperature reference optical signals and outputting position signals and temperature signals. The combination has processing means for processing the position signals and the temperature signals and outputting to the flight controller a plurality of position values associated with respective positions of the displaceable objects and temperature values associated with the temperatures at the plurality of locations.

The above and other objects, advantages and features are further accomplished in accordance with the invention by the provision of a method for determining the temperature at a first location, including the steps of producing a chirped rf signal and a modulated optical signal having an envelope of modulation with a phase that is known with respect to the phase of the chirped rf signal; transmitting the modulated optical signal along an optical path toward the first location; receiving and guiding the modulated optical signal within the first location; producing a temperature sensing optical target signal by reflecting a portion of the modulated optical signal after the modulated optical signal passes through the first location; producing a reference optical signal by reflecting a portion of the modulated optical signal before the modulated optical signal reaches the first location; receiving the chirped rf signal, the reference optical signal and the target optical signal having first and second time delays with respect to the chirped rf signal, respectively; producing a multi-frequency electrical signal which includes a first frequency corresponding to the first time delay and a second frequency corresponding to the second time delay; and processing the multi-frequency signal to determine a difference frequency corresponding to the difference between the first frequency and the second frequency and representing the temperature at the first location.

The above and other objects, advantages and features are further accomplished in accordance with the invention by the provision of an optical sensing system for sensing the temperature at a first location, including: an electro-optical unit for outputting a modulated optical signal and a chirped rf signal, the envelope of the modulated optical signal having a phase that has a known relation to the phase of the chirped rf signal; a fiber coupled to the electro-optical unit for receiving and transmitting the modulated optical, the fiber having a first end and a second end, the first end receiving the modulated optical signal and transmitting the optical modulated optical signal toward the second end, the second end reflecting a portion of the modulated optical signal back towards the first end as a reference optical signal and transmitting a remaining portion of the modulated optical signal; a reflector connected to a temperature sensing bi-metallic strip at the first location, the reflector being optically upstream from the fiber for receiving the remaining portion of the modulated optical signal and reflecting the remaining portion of the modulated optical signal back toward the second end of the fiber, the fiber receiving and guiding the remaining portion of the modulated optical signal back towards the first end as a target optical signal; transducing unit, having an output and two inputs, one of the two inputs being electrically coupled to the electro-optical unit for receiving the chirped rf signal and the other of the two inputs being optically coupled to the fiber for receiving the reference optical signal and the target optical signal having first and second time delays with respect to the chirped rf signal, respectively, the transducing unit producing at its output a multi-frequency electrical signal which includes a first frequency corresponding to the first time delay a second frequency corresponding to the second time delay; and temperature detecting unit coupled to the output of the transducing unit for processing the multi-frequency signal and determining a difference frequency corresponding to the difference between the first frequency and the second frequency and representing the temperature at the first location.

The above and other objects, effects, features and advantages of the present invention will become more apparent from the following description of embodiments thereof taken in conjunction with the accompanying drawings.

BRIEF DESCRIPTION OF THE DRAWINGS

FIG. 2 shows a partially broken away side view of a typical linear actuator which can be used with the optical sensing system of the invention.

FIGS. 7a–7c correspond to FIGS. 6a–6c but with non-linear RF chirps output from chirp source 102 of FIG. 3.

DETAILED DESCRIPTION OF PREFERRED EMBODIMENTS

Figure 1A:
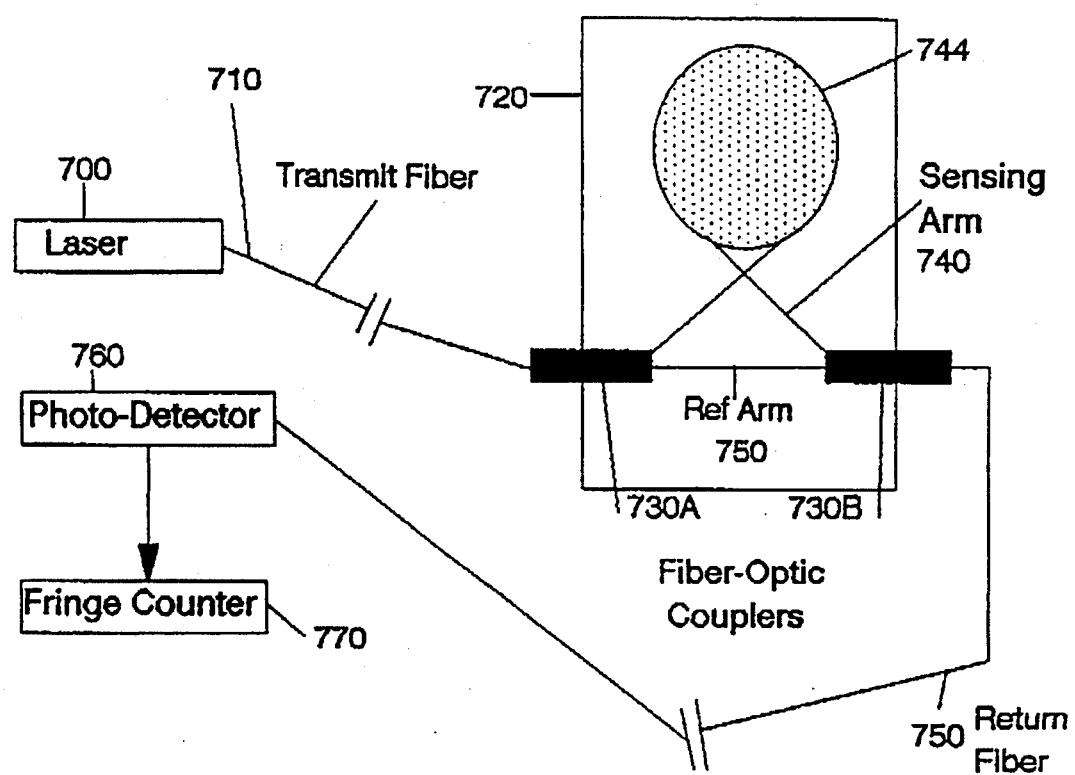
FIG. 1a is a schematic showing an optical temperature sensing system which operates like an interferometer.
Figure 1B:
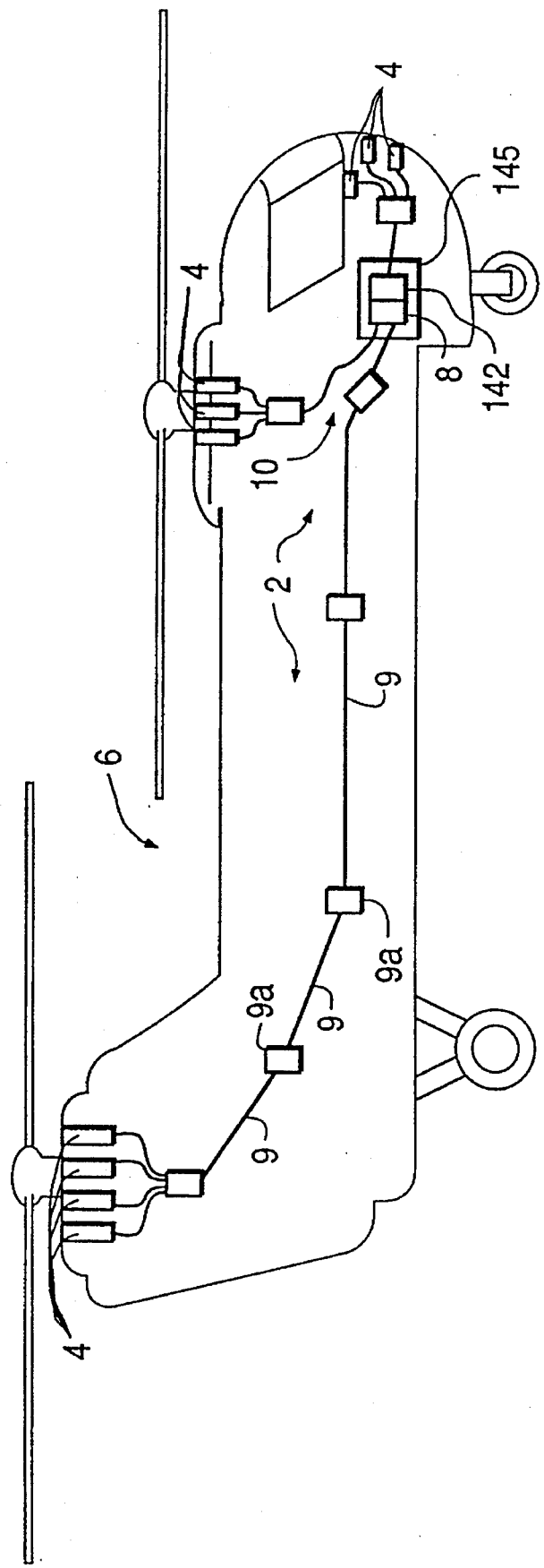
FIG. 1b is a schematic showing an application of an optical sensing system according to the invention in a helicopter.

In order to realize a small, lightweight fiber optic sensor system which has EMI/EMP immunity, it is desirable to use passive sensor heads in which all electrical connections at the sensor heads are eliminated. FIG. 1b shows an optical sensing system 2 with passive sensor heads 4 in a helicopter 6 with a flight controller 8. Optical signals are coupled between sensor heads 4 and flight controller 8 by a light guide system, which in the disclosed embodiment comprises optical fibers 9 and optical connectors 9a connecting together different sections of optical fibers. As can be seen, if N passive sensor heads 4 are used, all electrical connections for fiber optic sensor system 2 and controller 8 can be maintained in a centralized, easy to shield location 10.

FIG. 2 shows an example of an actuator 20 (Boeing 767 outboard spoiler) associated with one of the passive sensor heads 4 schematically shown in FIG. 1b. Actuator 20 has an outer casing 22 within which a metal tube 23 moves in response to control signals from flight controller 8 input on wires 23a which control hydraulic valves (not shown) causing hydraulic pressure in cavity 23b to increase or decrease thereby causing metal tube 23 to slide back and forth within outer casing 22. Metal tube 23 is connected to an outer rod 23c which is attached at its right-hand end to an object 23d such as a control surface to be controlled by the flight controller. Rod 24 is secured to metal tube 23 and moves within a sensor casing 25 guided by a sealing ring 26. Rod 24 can move between points Lai and Lbi a total stroke length $L_i$=Lai–Lbi, and at any point in time rod 24 is at a position $L_{Si}$ with respect to a reference point $L_{Ri}$. An electrical sensor head for actuator 20 has several coils of wire (not shown) wrapped around sensor tube 25 which output signals corresponding the position of rod 24 to flight controller 8 via wires 27. A typical electrical sensor is GM6850E linear transducer by Kavlico Corporation. Stroke $L_i$ can vary from several millimeters to over 50 centimeters. In addition, the position $L_{Si}$ of rod 24 must be updated and sent to flight controller 8 at rates $R_i$ of several hundred Hz and with lag times $T_{Li}$ under 0.5 ms. Again, lag time $T_{Li}$ is defined to be the time from which data is sensed from $i^{th}$ passive sensor head 4 to the time the position measurement $L_{Si}$ is calculated and transmitted to flight controller 8. Finally, position measurements must be made with an accuracy of $\delta L_{Si}$ of a few hundred micrometers and preferably less than 100 micrometers. In addition, controller 8 must simultaneously receive position information from all passive sensor heads 4. Sensor head 4 can be completely embedded inside actuator 20. Depending on the object (control surface) to which actuator 20 is attached, controller 8 may require position information at rates of several hundred Hz in order to complete a feedback loop thereby maintaining operation of the aircraft. Controller 8 can be a computer or microcomputer and completes flight control loops in a known manner.

Figure 3:
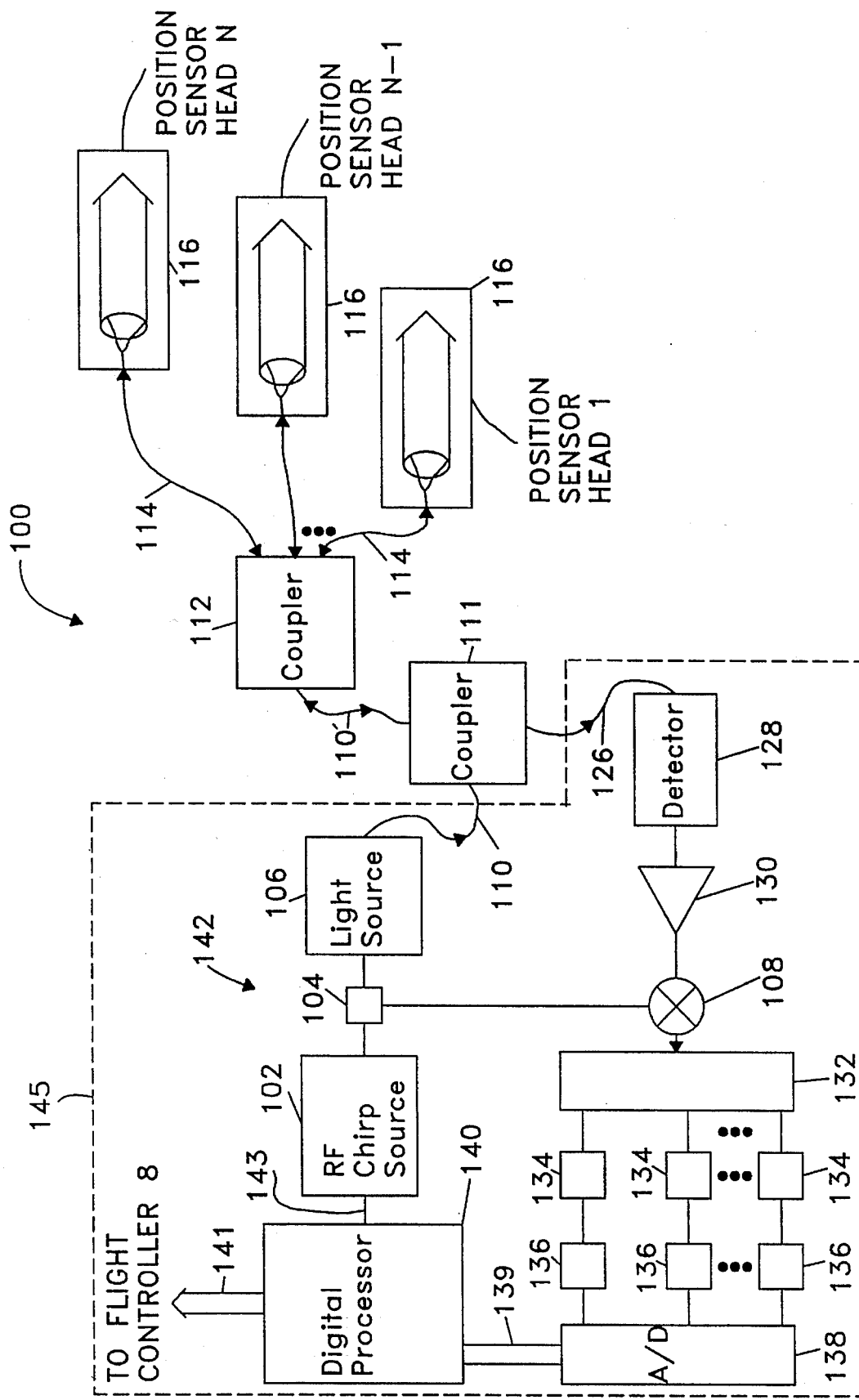
FIG. 3 is a block circuit diagram of one embodiment of the optical sensing system according to the invention.

An embodiment of an optical sensing system 100 according to the invention is shown in FIG. 3. An RF chirp source 102 produces an RF signal with a linearly varying frequency over a chirp duration T. This RF signal is sometimes referred to as a "chirped" RF signal. The chirped RF signal is split into two chirped RF signals using an RF splitter or power divider 104. One of the two chirped RF signals is used to drive (intensity modulate) a light source 106 and the other is used as an RF local oscillator signal which is input to an RF mixer 108. Light source 106 outputs an intensity modulated (IM) optical signal with an envelope which is chirped in phase with the chirped RF signal. The chirped IM optical signal is guided down a first transmitting optical fiber 110 to an optical coupler 111 and then to an optical coupler 112 via transmitting/receiving fiber 110' where it is divided, in a known manner, into N chirped IM optical signals, where N is a positive integer. These N chirped IM optical signals are input to N second transmitting optical fibers 114 each of which transmits one of the N chirped IM optical signals to one of N position sensor heads 116 (corresponding to sensor heads 4 in FIG. 1b).

RF chirp source 102 can be an electrically controlled rf source such as a YIG tuned oscillator for example a Ferretec FS02106. RF chirp source 102 can also be a processor with a digital-to-analog converter that creates digital signals representing RF chirps and then digital-to-analog converts the chirps. Light source 106 could be a laser diode such as Lasertron QLM1300MW, a solid state laser, or even a light emitting diode (LED). First transmitting fiber 110 and N second transmitting fibers 114 can be multi-mode or single mode fibers. An example of RF splitter 104 is Picosecond Labs 5330. An example of optical coupler 111 is Australian Optical Fiber AOFR AS50-09-R-C-ST which is a 2×2 asymmetric coupler. If light source 106 is a pigtailed diode laser with fiber 110 being a single mode fiber and pigtailed to light source 106 then coupler 111 can be a multimode coupler and yet optical coupling loses remain low (≈3 dB) since the single mode pigtail excites only lower order modes in transmitting/receiving fiber 110' and multimode transmitting fibers 114 when light approaches sensor heads 116.

Figure 4:
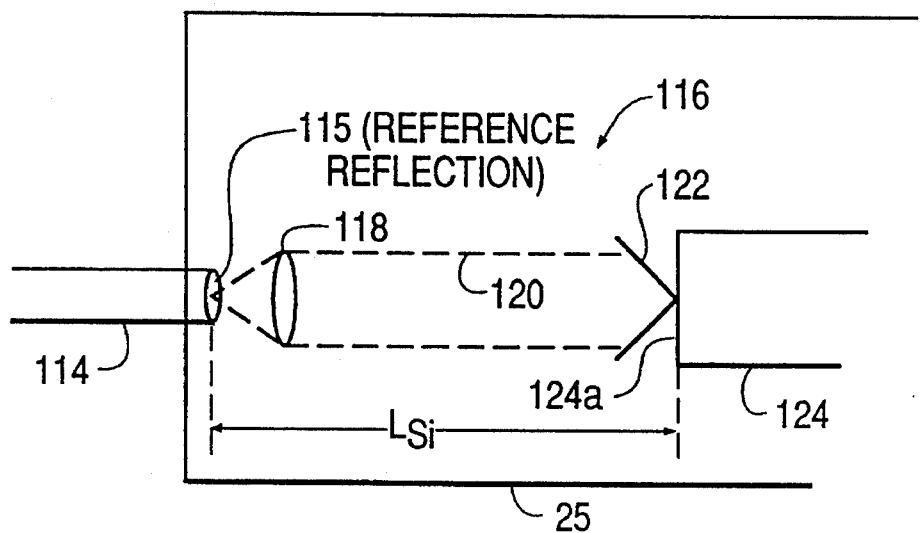
FIG. 4 shows an enlarged view of sensor heads in FIG. 3 which are position sensor heads.

FIG. 4 shows a closeup view of one of the position sensor heads 116 corresponding to sensor heads 4 in FIG. 1b. Sensor head 116 is embedded in sensor tube 25. One of the N chirped IM optical signals is output by a second transmitting fiber 114 to a lens 118 which collimates the chirped IM optical signal into a collimated beam 120. Collimated beam 120 travels to a corner cube 122 which acts as a retroreflector reflecting the collimated beam 120 back through lens 118 and into second transmitting fiber 114. Corner cube 122 is secured to an end face 124a of a rod 124 which corresponds, for example, to rod 24 in actuator 20 shown in FIG. 2. Any type of reflecting surface can be used in lieu of corner cube 122 as long as it scatters sufficient optical energy back to second transmitting fiber 114. For example, the end of rod 124 can be coated with a commercially available retroreflective material or the end surface of rod 124 may already be sufficiently reflective to serve the intended purpose.

After scattering off corner cube 122, beam 120 passes back through lens 118 as a chirped IM optical target signal (sometimes referred to herein as a position sensing optical signal) and into second transmitting fiber 114 which guides the chirped IM optical target signal back to optical coupler 112. This occurs for each of N position sensor heads 116 corresponding to N second transmitting fibers 114. Returning to FIG. 3, the N chirped IM optical target signals are then redirected by optical coupler 112 to transmitting/receiving fiber 110' to coupler 111 then to a receiving fiber 126 which guides the N chirped IM optical target signals to a photodiode receiver (or detector) 128. Photodiode receiver 128 detects the N chirped IM optical target signals and outputs corresponding N delayed chirped RF target signals. Receiving fiber 126 can also be a single or multi-mode fiber. An example of photodiode receiver 128 is Antel ARD-28.

First transmitting fiber 110, transmitting/receiving fiber 110' second transmitting fiber 114 and receiving fiber 126 introduce a time delay $\delta T_{Ri}$ for the $i^{th}$ chirped IM optical signal. The 110' sensor head 116 delays the $i^{th}$ chirped IM optical signal by an additional amount, $\delta t_i$ corresponding to the time that beam 120 travels a distance $\delta L_{Si}$. That is, beam 120 travels from tip 115 of second transmitting fiber 114 through lens 118 to corner cube 122 back through lens 118 and to tip 115 in time $\delta t_i$. Therefore, the total delay $\delta T_{Ti}$ for the $i^{th}$ chirped IM optical signal is $$\delta T_{Ti} = \delta T_{Ri} + \delta t_i. \qquad \text{Eq.(1)}$$

Photodiode receiver 128 outputs N delayed chirped RF target signals starting at N different times corresponding to N delays $\delta T_{T1}, \ldots, \delta T_{TN}$. These N delayed chirped RF target signals are amplified by a linear amplifier 130 which outputs N amplified RF target signals to RF mixer 108. RF mixer 108 mixes the N amplified RF target signals with the RF local oscillator signal from RF splitter 104. An example of linear amplifier 130 is Miteq AFS4-00101000-30-10P-4, and an example of RF mixer 108 is Avantek TFX18075L.

Figure 5A:
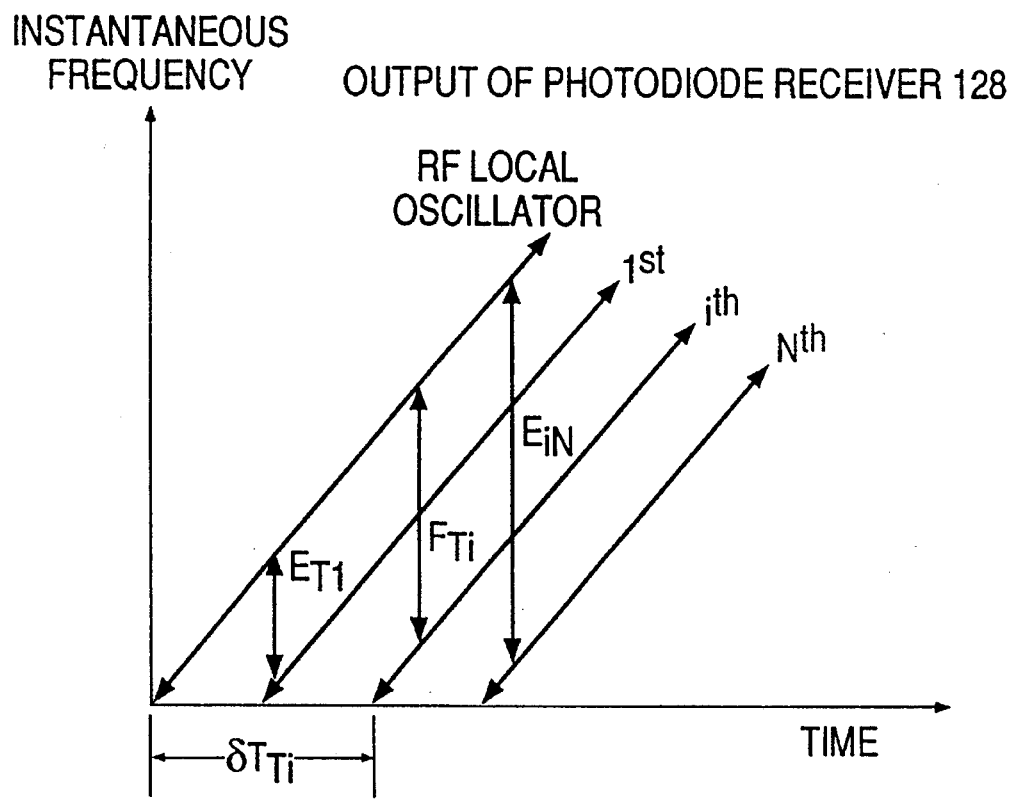
FIGS. 5a–5c show graphical representations of an RF mixing process at mixer 108 in FIG. 3.
Figure 5B:
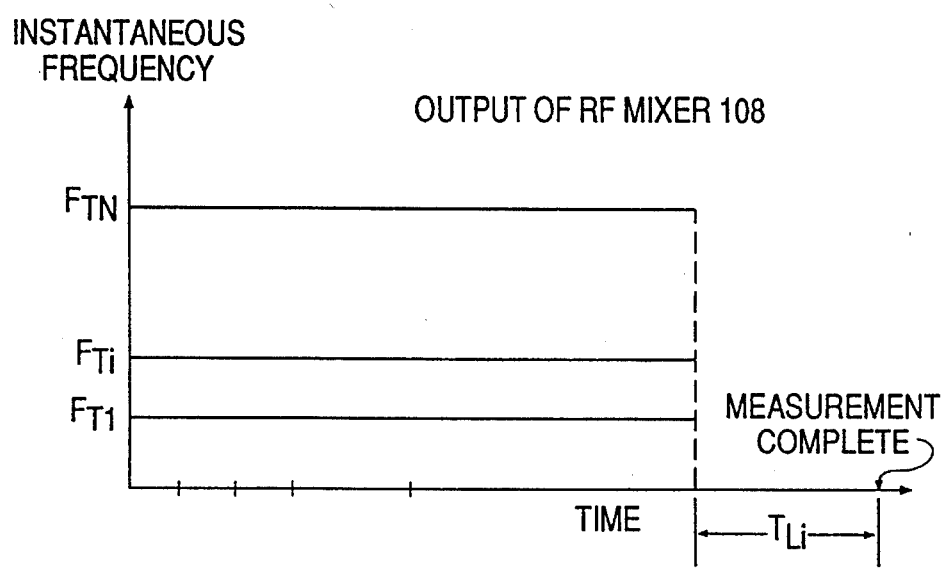
Figure 5C:
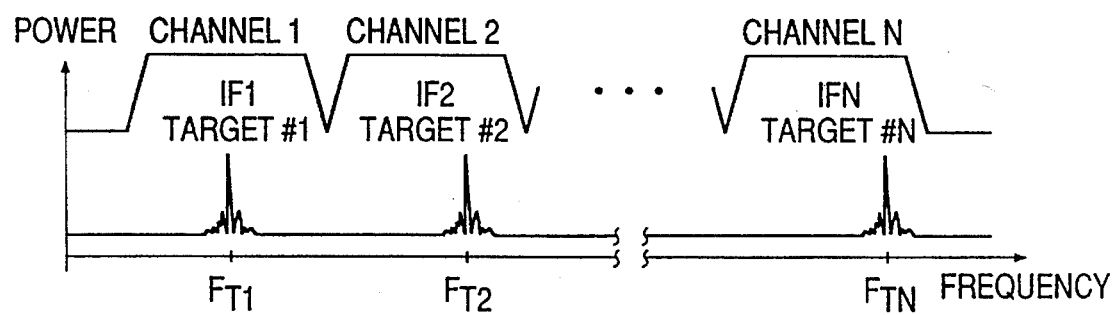

FIGS. 5a–5c show graphical representations of the RF mixing process. FIG. 5a is a graphical representation (not to scale) in frequency versus time of the RF chirped local oscillator signal and the $1^{st}, \ldots,$ ith, $N^{th}$ delayed chirped RF target signals at the inputs of RF mixer 108. The $1^{st}, \ldots,$ ith, $\ldots, N^{th}$ delayed chirped RF target signals have delays $\delta T_{T1}, \ldots, \delta T_{Ti}, \ldots, \delta T_{TN}$, respectively.

FIG. 5b is a graph in frequency versus time of the N intermediate frequency (IF) target signals output by RF mixer 108. In particular, mixing the RF local oscillator signal with the N delayed chirped RF target signals results in N intermediate frequency (IF) target signals with peak frequencies $F_{T1}, \ldots, F_{Ti}, \ldots, F_{TN}$, corresponding to delays $\delta T_{T1}, \ldots, \delta T_{Ti}, \ldots, \delta T_{TN}$, respectively.

FIG. 5c shows a Fourier transformation of the N intermediate frequency target signals when delays $\delta T_{T1}, \ldots, \delta T_{TN}$ are adequately spaced apart; namely, when the lengths of N second transmitting fibers 114 are chosen such that the peak frequencies $F_{T1}, F_{T2}, \ldots, F_{TN}$ are sufficiently spread apart to be filtered later.

Returning to FIG. 3, an N channel filter or de-multiplexing filter 132 filters and passes the N IF target signals to non-linear devices 134 which square the respective N IF target signals and output N squared IF target signals to respective audio low pass filters 136. Non-linear devices 134 are advantageous if not only IF target but also IF reference signals are used as will be discussed further below. Therefore, at this point non-linear devices 134 and low pass filters 136 can be bypassed and the N IF target signals can be input directly to analog-to-digital (A/D) converter 138. Analog-to-digital (A/D) converter 138 synchronously samples and digitally multiplexes the N IF target signals output by audio low pass filters 136. A digital processor 140 then receives the digitized signals from A/D converter 138 and calculates and sends position information to flight controller 8 via a bus 141. Digital processor 140 synchronizes data gathering with the generation of RF chirp ramping by RF chirp source 102 by sending RF chirp source 102 clock information via line 143. Digital processor 140 can also digitally create chirps and digital-to-analog convert these digital chirps to an analog chirped RF signal for modulating light source 106. An example of digital processor 140 is an IBM AT compatible microcomputer with a Mercury MC-32-AT-IO6 vector processing board.

The active electronics as described above may be packaged as a unit 142 and placed in an electro-magnetic shield 145 (FIGS. 1 and 3) and thus confined to a single location on helicopter 6. Electro-magnetic shield 145 can be made of metal and could shield controller 8 as well.

The delays $\delta T_{T1}, \ldots, \delta T_{Ti}, \ldots, \delta T_{TN}$ vary due to temperature changes of first transmitting fiber 110, transmitting/receiving fiber 110', the N second transmitting fibers 114 and receiving fiber 126. This can lead to significant errors in the position measurement of rod 124. For example, temperature sensitivity of the index of refraction for glass is approximately $10^{-5}/°C$. so that a shift in temperature of 150° C. can lead to a 4.5 cm range measurement error for a 30 meter long fiber. In addition, vibrations in first transmitting fiber 110, optical coupler 112, N second transmitting fibers 114 or receiving fiber 126 can cause a shift in the peak frequencies $F_{Ti}, \ldots, F_{TN}$. Therefore, the position of corner cube 122 and consequently of rod 124 in each position sensor head. 116 cannot be determined with high accuracy by solely measuring the peak frequencies $F_{T1}, F_{T2}, \ldots, F_{TN}$ of the N intermediate frequency target signals.

The effects due to temperature variations and mechanical vibrations and cable length tolerances are eliminated by producing and processing N chirped IM optical "reference" signals along with the N chirped IM optical target signals as discussed below. These N chirped IM optical reference signals experience nearly identical delays from temperature fluctuations and fiber vibrations as the N chirped IM optical target signals. The N chirped IM optical reference signals are detected by photodiode receiver 128 which outputs N corresponding chirped RF reference signals which are also mixed with mixer 108 to produce N IF reference signals.

The N chirped IM optical reference signals are produced, for example, from radiation scattered back off tips 115 (FIG. 4) of N second transmitting fibers 114 due to a fibercore/air interface at tips 115. They can also be produced using connectors or fusion spliced in-line references which are relatively close (e.g.<1 m) to tips 115 of N second transmitting fibers 114. Hence, the N chirped IM optical signals are scattered back through N second transmitting fibers 114, optical coupler 112 and return fiber 126, and are detected by photodiode receiver 128. The amplitudes of the N chirped IM optical reference signals can be varied depending on how tips 115 are cleaved. For example, if tips 115 are cleaved at an angle with respect to a 90° transverse cross section of the N second transmitting fibers 114, then the amplitudes of the N chirped IM optical signals can be reduced. Also, if tips 115 are coated with a dielectric such as titanium dioxide (TiO2), the amplitudes of the N chirped IM optical reference signals can be increased. It is desirable to have N target and N reference signals with approximately the same amplitudes.

As will now be shown, effects due to vibrations and variations in temperature of fibers 110, 110', 114 and 126 can be eliminated and the delay $\delta t_i$ can be obtained for each of the N sensor heads 116 by measuring and appropriately processing the target and reference peak frequencies $F_{R1}, F_{T1}, \ldots, F_{RN}, F_{TN}$. The $i^{th}$ total fiber length $L_{Fi}$ is related to the $i^{th}$ IF reference frequency $F_{Ri}$ as follows:

$$F_{Ri} = 2B/T \; (L_{Fi}/V_f); \qquad \text{Eq. (2a)}$$

and the $i^{th}$ total fiber length $L_{Fi}$ and the $i^{th}$ target distance $L_{Si}$ are related to the $i^{th}$ target frequency $F_{Ti}$ as follows:

$$F_{Ti} = 2B/T \; (L_{Fi}/V_f + L_{Si}/c); \qquad \text{Eq. (2b)}$$

where, i=1, 2, ... N
B=chirp bandwidth,
T=chirp duration,
$V_f$=fiber propagation velocity,
C=speed of light,
$L_{Fi}$=length of total fiber to the $i^{th}$ sensor head 116.
$L_{Si}$=distance between tip 115 and corner cube 122 for $i^{th}$ sensor head 116.

Difference frequencies $F_{Di}$ can then be obtained, where $$F_D = F_{Ti} - F_{Ri}, \text{ and } i=1, 2, \ldots, N.$$

Using Equations (2a) and (2b), the difference frequency $F_{Di}$ for each of the i=1, ..., N position sensor heads 116 is, $$F_{Di} = (2B/T)(L_{Si}/C), \qquad \text{Eq. (3a)}$$

from which the target position $L_{Si}$ is, $$L_{Si} = F_{Di}(cT/2B). \qquad \text{Eq. (3b)}$$

Equation 3b can be used to determine the position $L_{Si}$ of rod 124 in each position sensor head 116. Hence, the position measurement of each rod 124 is independent of mechanical and thermal effects that change the fiber length or propagation velocity of optical radiation in any of the fibers in optical sensing system 100.

Figure 6A:
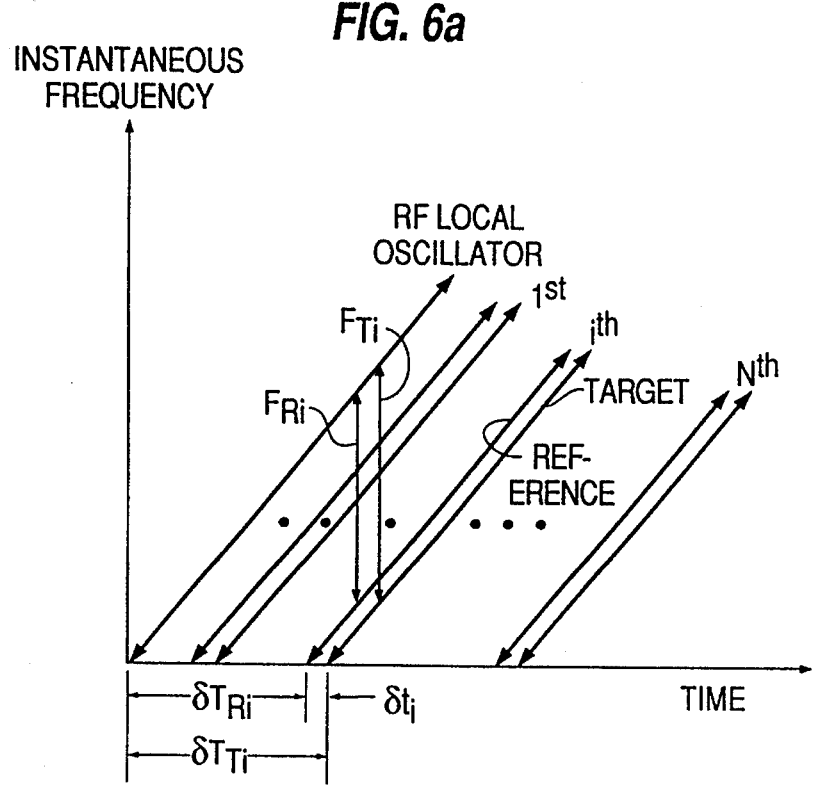
FIGS. 6a–6c correspond to FIGS. 5a–5c but with an additional N chirped optical reference signals.
Figure 6B:
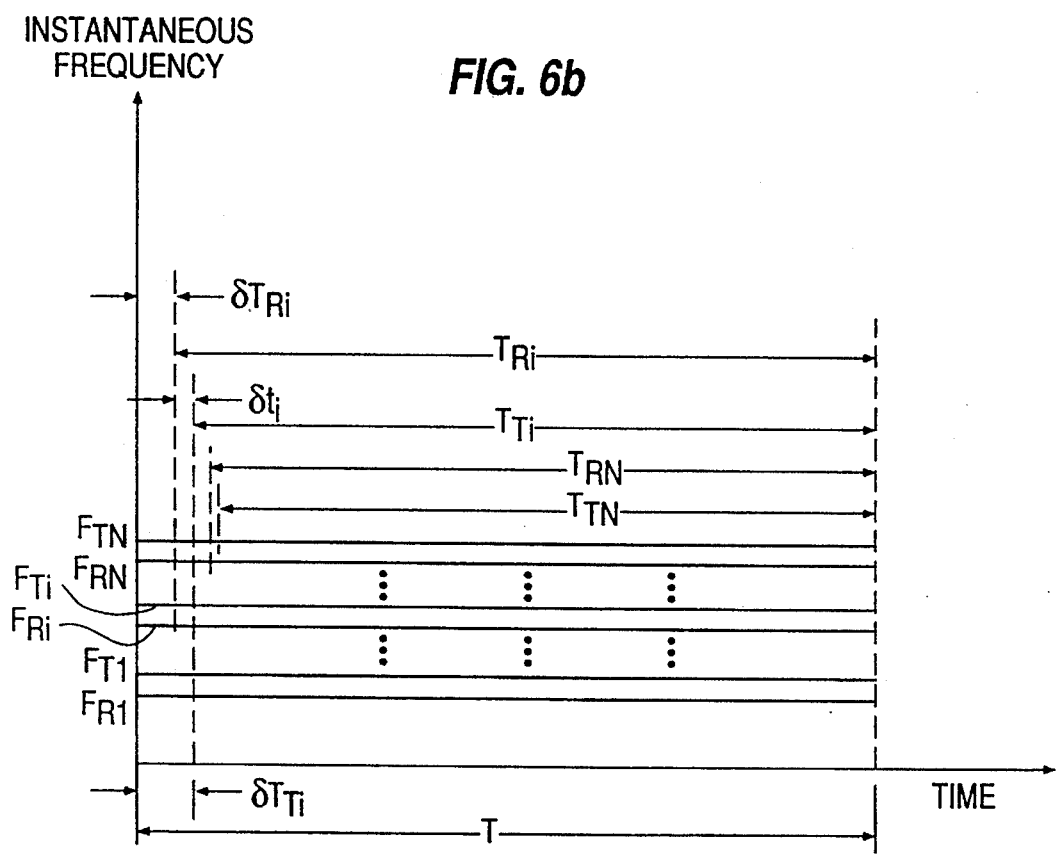
Figure 6C:
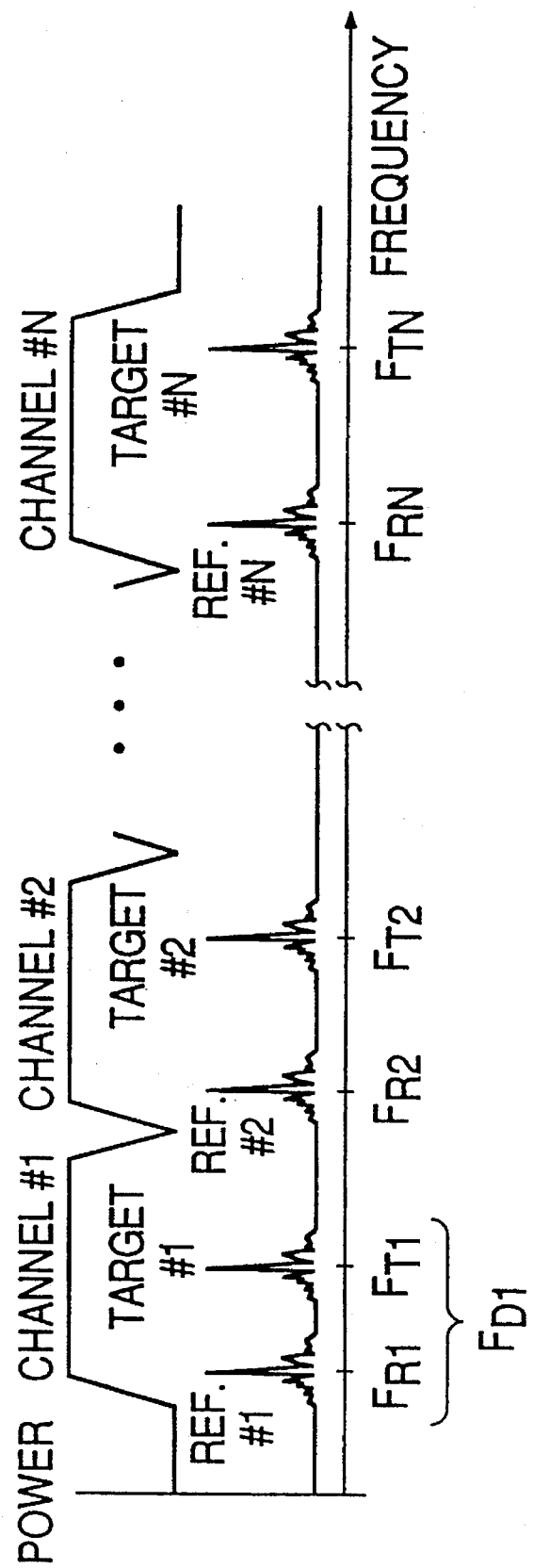

FIGS. 6a–6c correspond to FIGS. 5a–5c with the additional N chirped optical reference signals. FIG. 6a shows the RF local oscillator signal and the $1^{st}$, ..., ith, $N^{th}$ delayed chirped RF target and reference signals at the input of RF mixer 108. The $1^{st}$, ..., ith, $N^{th}$ delayed chirped RF target signals have delays $\delta T_{T1}, \ldots, \delta T_{Ti}, \ldots \delta T_{TN}$, respectively and the $1^{st}$, ..., ith, $N^{th}$ delayed chirped RF reference signals have delays $\delta T_{R1}, \ldots, \delta T_{Ri}, \ldots, \delta T_{RN}$, respectively.

FIG. 6b is a graphical representation of the N IF target signals with peak frequencies $F_{T1}, \ldots, F_{Ti}, \ldots, F_{TN}$ and the N corresponding IF reference signals with peak frequencies $F_{R1}, \ldots, F_{Ri}, \ldots, F_{RN}$, respectively, and chirp duration T. The delay of the $i^{th}$ IF target signal is $\delta T_{Ti}$ and the delay of the $i^{th}$ IF reference signal is $\delta T_{Ri}$. Since the $i^{th}$ IM optical target signal traveled a longer distance than the corresponding $i^{th}$ IM optical reference signal for each position sensor head 116, the delay of the $i^{th}$ target signal $\delta T_{Ti}$ is greater than the delay of the $i^{th}$ reference signal $\delta T_{Ri}$. Consequently, the peak frequency $F_{Ti}$ of the $i^{th}$ IF target signal is greater than the peak frequency $F_{Ri}$ of the $i^{th}$ IF reference signal as shown in FIG. 6b.

FIG. 6b also shows that the $i^{th}$ IF target signal is available to be sampled by A/D converter 138 for a time $T_{Ti}$ and the $i^{th}$ IF reference signal is available to be sampled for a time $T_{Ri}$, where $$T_{Ti} = T - \delta T_{Ti} \qquad \text{Eq. (4)}$$

$$T_{Ri} = T - \delta T_{Ri}$$

Typically, sensor heads 116 are located 20 to 30 meters from active electronics unit 142 and therefore $\delta T_{Ti}$ and $\delta T_{Ri}$ are much smaller than T. Consequently the time that A/D converter 138 can sample the target signal and the reference signal is approximately the duration T of the chirp. The difference in delay between the delay of the target signal $\delta T_{Ti}$ and the delay of the reference signal $\delta T_{Ri}$ is $\delta t_i$, i.e., $$\delta t_i = \delta T_{Ti} - \delta T_{Ri} \qquad \text{Eq. (5)}$$

Since the $i^{th}$ IM optical target signal must travel a round trip distance which is twice the target position $L_{Si}$, the $i^{th}$ delay $\delta t_i$ is related to the $i^{th}$ target position $L_{Si}$ by $$L_{Si} = \frac{c\delta t_i}{2} \qquad \text{Eq. (6)}$$

FIG. 6c shows a frequency spectrum of the IF target and reference signals at the output of RF mixer 108 when the N chirped RF reference signals are mixed with the local oscillator signal. The peak frequencies $F_{R1}, F_{R2}, \ldots, F_{RN}$ corresponding to each of the N IF reference signals will vary with temperature and vibrations in a manner nearly identical to variations in peak frequencies $F_{T1}, F_{T2}, \ldots, F_{TN}$, respectively, of the IF target signals.

N channel filter 132 in FIG. 3 is made of N bandpass filters with output channels 1, ..., N coupled into non-linear devices 134. Non-linear devices 134 produce both sum terms $F_{Si} = F_{Ti} + F_{Ri}$ and difference terms $F_{Di} = F_{Ti} - F_{Ri}$. Transfer characteristics of non-linear device 134 should be as close to "square law" as possible so as to minimize harmonics of the difference frequencies $F_{Di}$. Examples of non-linear devices 134 include crystal detectors, mixers, RF power detectors or zero-biased diodes, saturated amplifiers, logarithmic amplifiers, analog multipliers and limiters.

The outputs of non-linear devices 134 are input to audio low pass filters 136 in order to eliminate the sum terms $F_{Si}$. Analog-to-digital (A/D) converter 138 synchronously samples and digitally multiplexes analog signals output by audio low pass filters 136. Digital processor 140 receives the digitized difference signals from A/D converter 138 and determines the N difference frequencies $F_{D1}, \ldots, F_{DN}$ relative to which the positions $L_{Si}$ of rods 124 are directly proportional, independent of temperature variations and vibration as previously explained.

An alternative approach to obtaining $F_{Di}$ involves bypassing nonlinear devices 134 and directly determining peak frequencies $F_{Ri}$ and $F_{Ti}$ using digital processor 140. Once peak frequencies $F_{Ri}$ and $F_{Ti}$ are determined, difference frequency $F_{Di}$ could be calculated by subtracting $F_{Ri}$ from $F_{Ti}$ using digital processor 140, thereby cancelling out errors due to temperature variations and mechanical vibrations as discussed above. In addition, this approach can cancel out errors caused by the non-repeatability in the slope (frequency versus time) of chirps. However, this approach can result in a performance penalty due to non-linearities in frequency versus time of any one chirp output by chirp source 102 as will now be discussed.

A theoretically best performance achievable by a signal processor which estimates a peak frequency of a tone in additive white Gaussian noise is discussed in "High-Precision Fiber-Optic Position Sensing Using Diode Laser Radar Techniques" by G. L. Abbas et al., SPIE Vol. 1219, *Laser-Diode Technology and Applications II* (1990), incorporated herein by reference. There it is shown that estimation error $\delta L_{Ti}$ (which is defined here to be the accuracy of the estimation) and target signal-to-noise density ratio $(SNDR_{TARi})$ at the output of photodiode receiver 128 for the $i^{th}$ IF target signal are given by $$\delta L_{Ti} = \frac{(3)^{1/2} c}{2\pi B (SNDR_{TARi} T)^{1/2}}, \qquad \text{Eq. (7a)}$$

and $$SNDR_{TARi} = \frac{\text{SIGNAL POWER}_{TARi}}{\text{SHOT NOISE} + \text{THERMAL NOISE} + \text{INTENSITY NOISE}}, \qquad \text{Eq. (7b)}$$

where SHOT NOISE and THERMAL NOISE are receiver parameters, INTENSITY NOISE is a laser parameter, B is the RF chirp bandwidth, T is the estimation time (chirp duration), and c is the speed of light. Similarly, the estimation error $\delta L_{Ri}$ and reference $SNDR_{REFi}$ for an optimal estimator is given by $$\delta L_{Ri} = \frac{(3)^{1/2} c}{2\pi B \, (SNDR_{REFi} T)^{1/2}}, \quad \text{Eq. (8a)}$$

and $$SNDR_{REFi} = \frac{\text{SIGNAL POWER}_{REFi}}{\text{SHOT NOISE + THERMAL NOISE + INTENSITY NOISE}} \quad \text{Eq. (8b)}$$

As can be seen from Equations 7a and 8a, increasing the chirp bandwidth B and the sampling time T decreases the estimation errors $\delta L_{Ti}$ and $\delta L_{Ri}$, respectively. Finally, assuming independence of target error $\delta L_{Ti}$ and reference error $\delta L_{Ri}$, differential range RMS error $\delta L_{Si}$ is, $$(\delta L_{Si})^2 = (\delta L_{Ti})^2 + (\delta L_{Ri})^2. \quad \text{Eq. (9)}$$

Referring to FIG. 1b, controller 8 of helicopter 6 typically requires data from sensor heads 4 (or 116 in FIG. 3) to be output at rates exceeding several hundred Hz and lag times under about 0.5 ms. Therefore, the chirp duration T should not exceed about 1 ms. In addition, actuators such as actuator 20 of FIG. 2, can have stroke lengths $L_i$ ranging from 0.5 cm to over 50 cm requiring an accuracy $\delta L_{Si}$ of less than 200 micrometers depending on the particular actuator. In order to achieve this accuracy, the chirp bandwidth B should be as large as possible. Referring to FIG. 4, if T=1 ms and B=6 GHz, each additional millimeter of separation between reference reflector (e.g., tip 115) and target reflector (e.g., corner cube 122) results in 40 Hz increase in difference frequency $F_{Di}$. Therefore, if tip 115 and corner cube 122 are separated by 50 cm, i.e., $L_{Si}$=50 cm, then $F_{Di}$ is 20 kHz. In this case, the peak frequency $F_{Ti}$ of the $i^{th}$ IF target and the peak frequency $F_{Ri}$ of the $i^{th}$ IF reference signal must be determined to within a few Hz in order to achieve accuracies of a few hundred micrometers. This means that RF chirp source 102 must output a chirp which is linear to within a few kHz. In practice such linearity is not achievable over such a broad bandwidth and at such high chirp rates. However, non-linear devices 134 eliminate errors due to non-linearities of chirp source 102 as will be discussed below.

Figure 7A:
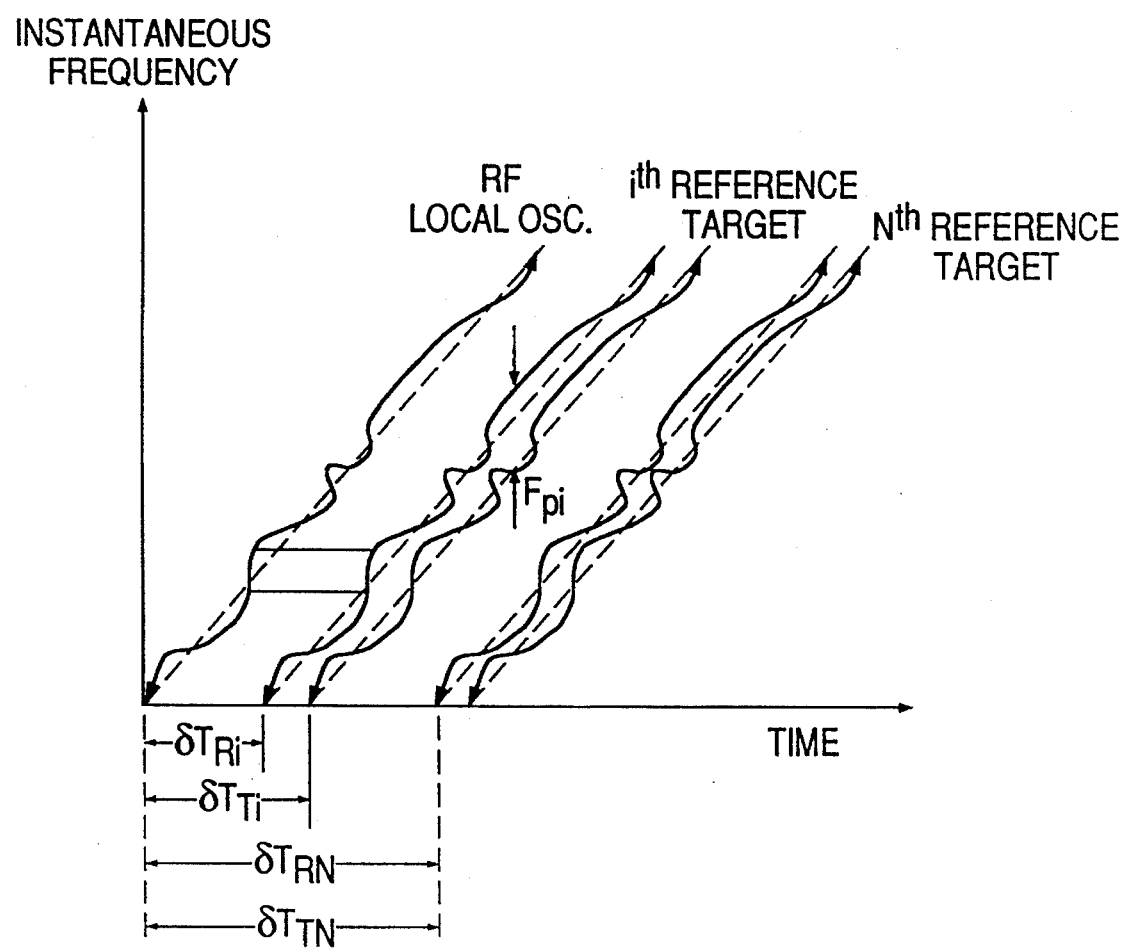
Figure 7C:
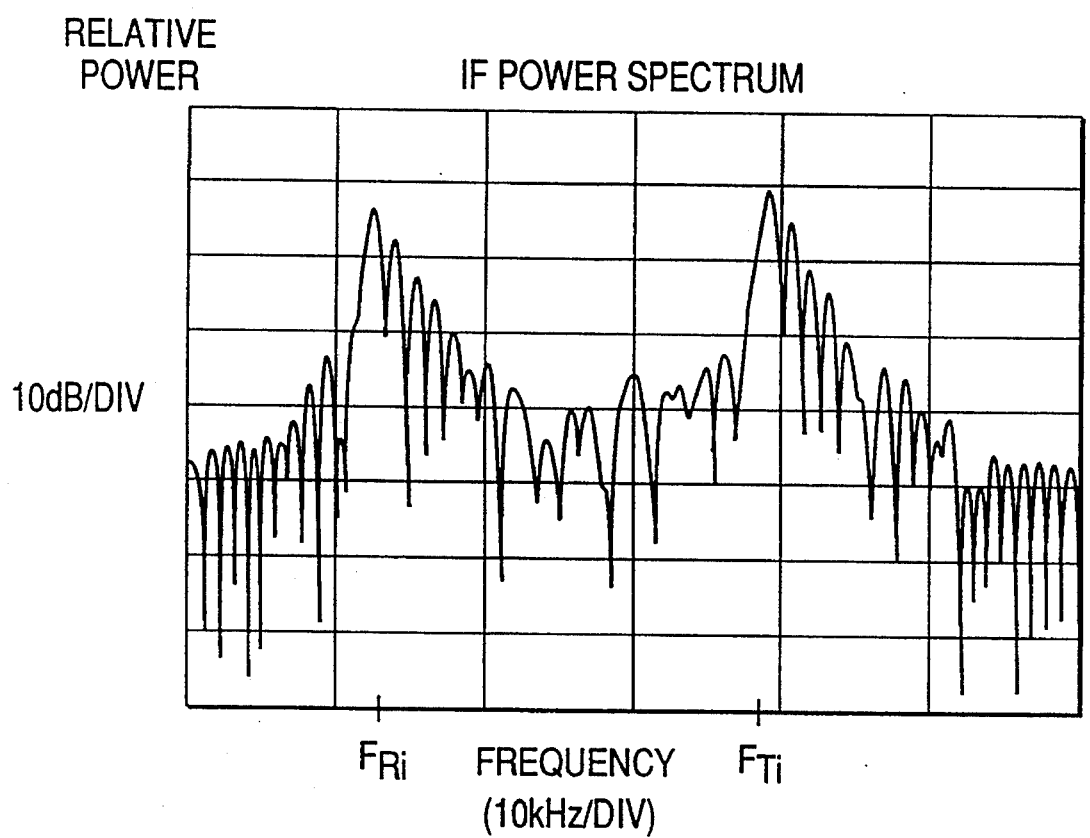

FIGS. 7a–7c correspond to FIGS. 6a–6c but with non-linear frequency versus time variations which occur in RF chirp source 102. FIG. 7a shows the RF local oscillator signal and the $1^{st}, \ldots, $ ith, $\ldots,$ and $N^{th}$ delayed non-linear chirped target and reference signals at the input of RF mixer 108. The $1^{st}, \ldots, $ ith, $\ldots, N^{th}$ delayed non-linear chirped RF target signals have delays $\delta T_{T1}, \ldots, \delta T_{Ti}, \ldots \delta T_{TN}$, respectively, and the $1^{st}, \ldots,$ ith, $\ldots, N^{th}$ delayed nonlinearly chirped RF reference signals have delays $\delta T_{R1}, \ldots, \delta T_{Ri}, \ldots \delta T_{RN}$, respectively.

FIG. 7b corresponds to FIG. 6b taking into account non-linearity of the chirped RF signal output by RF chirp source 102. If the total optical path length of the $i^{th}$ second transmitting fiber 114 added to the first transmitting fiber 110, transmitting/receiving fiber 110', and receiving fiber 126 is much larger than the corresponding stroke length $L_i$, then the condition $\delta t_i << \delta T_{Ti} \approx \delta T_{Ri}$ holds. In this case, non-linearities appearing at the output of mixer 108 nearly identically track each other as shown in FIG. 7b.

FIG. 7c shows a possible output of one of the channels in N channel filter 132. The distortions of the spectrum shown in FIG. 7c can be attributed to non-linear chirps produced by RF chirp source 102. Although the main lobes of the spectra corresponding to IF target and reference signals are identifiable, there is significant distortion around their peaks. These spectral distortions result in significant estimation errors of the peak frequencies $F_{Ri}$ and $F_{Ti}$. This distortion can be so great that the main lobes can be difficult to distinguish from the side lobes and it may be impossible to resolve the target signal from the reference signal.

Figure 8:
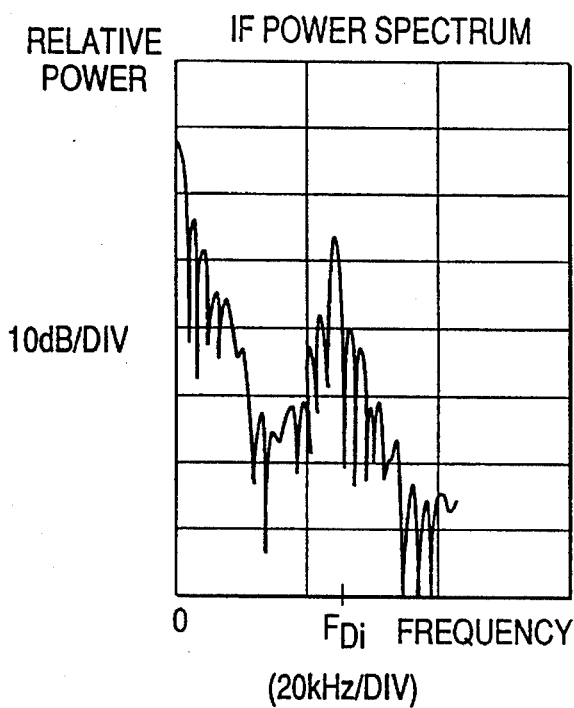
FIG. 8 shows a measured spectrum at a single channel output of audio low pass filters 136 of FIG. 3 after N IF target and N IF reference signals pass through non-linear devices 134.

FIG. 8 shows a measured spectrum for a single channel output of audio low pass filters 136 after the N IF target and N IF reference signals pass through non-linear devices 134. Here, the spectrum of the difference signal with peak frequency $F_{Di}$ and a DC signal is shown, with the spectrum corresponding to the difference signal being nearly symmetric about its peak frequency. The side lobes of the spectrum of the difference signal are about 12 dB down from the main lobe peak. As the ratio of delays $\delta t_i / \delta T_{Ri}$ increases, the advantage obtained by using non-linear devices 134 decreases, because non-linearities appearing in the reference signals and target signals will not track each other as well. However, as long as the condition $\delta t_i << \delta T_{Ri}$ is valid, RF chirp source 102 need not output extremely linear chirps and yet it is possible to obtain an extremely accurate estimation of peak frequency $F_{Di}$ using digital processor 140.

Figure 9A:
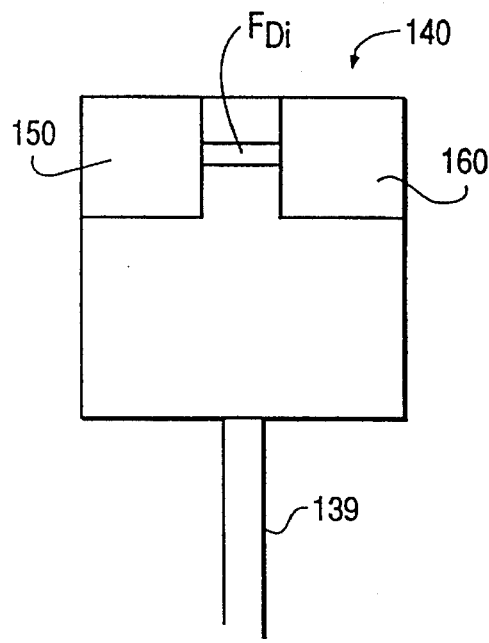
FIG. 9a is a block diagram representing the digital processor in FIG. 3.
Figure 9B:
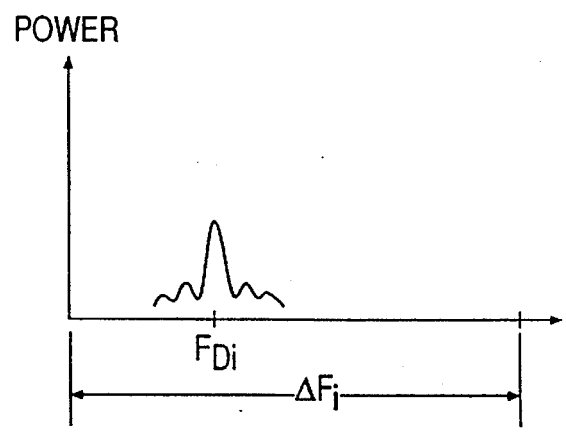
FIG. 9b shows a power versus frequency graphical representation of the bandwidth DFi corresponding to full stroke length $L_i$ of the $i^{th}$ position sensor head.

The peak frequencies $F_{Di}$ of the difference signals appearing at the output of audio low pass filters 136 can be estimated with high accuracy using digital processor 140 as follows. FIG. 9a is a block diagram illustrating a functional representation of digital processor 140 which includes a searcher 150 and a tracker 160. FIG. 9b shows the bandwidth $\Delta F_i$ corresponding to a full stroke length $L_i$ for $i^{th}$ position sensor head 116. Once searcher 150 acquires a first peak frequency of the difference signal, searcher 150 outputs this information to tracker 160. Digital processor 140 is in a search mode until peak frequency $F_{Di}$ has been output to tracker 160 at which point processor 140 goes into a tracking mode. The peak frequency of the difference signal $F_{Di}$ is then tracked by tracker 160 and updated at high rates with short lag times.

Figure 10:
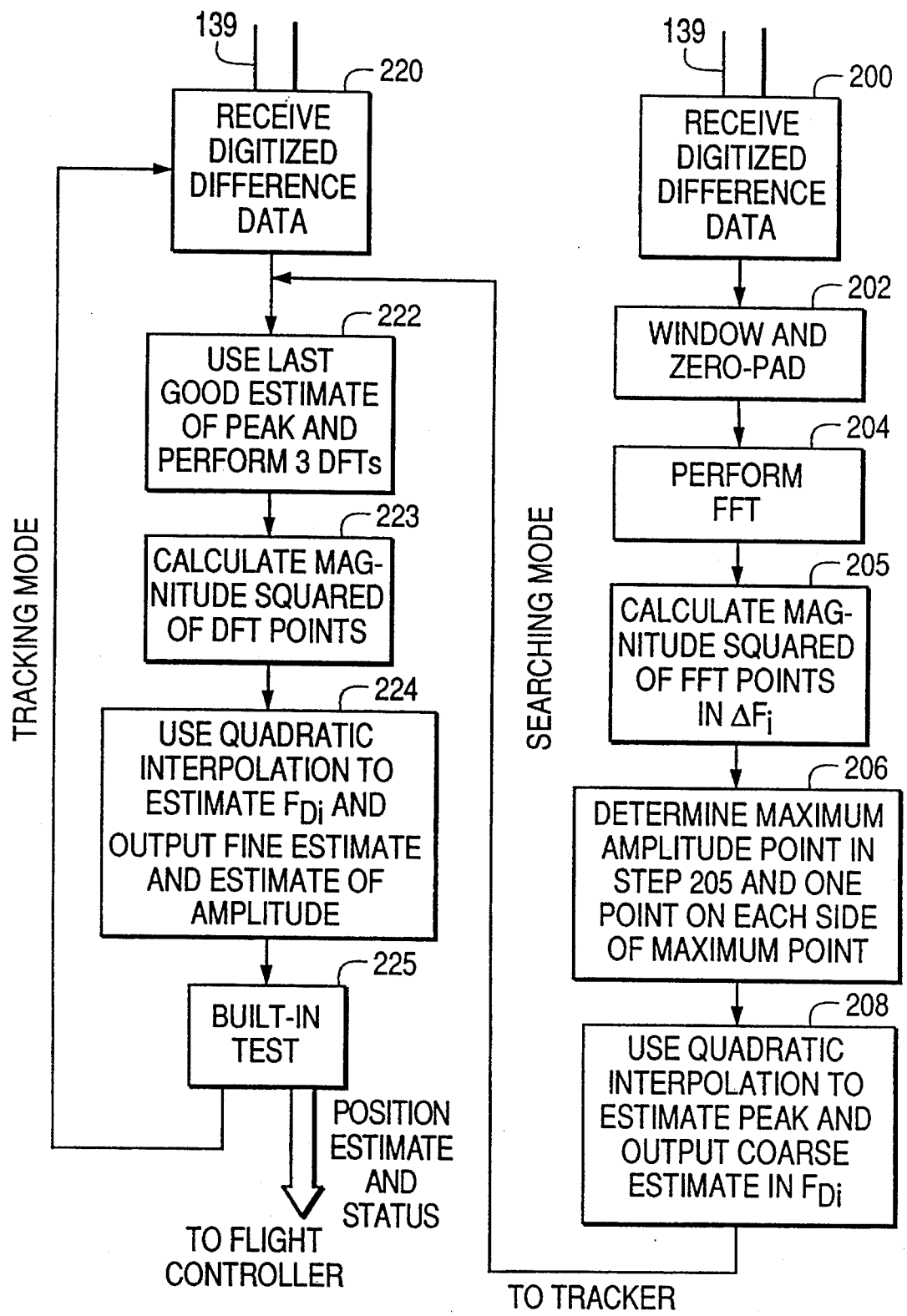
FIG. 10 is a flow diagram which shows processing steps for the search mode and the tracking mode of the digital processor in FIG. 9b.

FIG. 10 shows processing steps for the search mode and the tracking mode of processor 140 using digital processing techniques as are found in *Digital Signal Processing* by Oppenheim and Schafer, Prentice Hall, Inc., Englewood Cliffs, N.J. (1975), incorporated herein by reference. Searcher 150 is activated when processor 140 is in the search mode (steps 200–208) and tracker 160 is activated when processor 140 is in the track mode (steps 220–226). Searcher 150 operates as follows. At step 200, digital processor 140 receives the $i^{th}$ digitized difference data on databus 139 from A/D converter 138. Searcher 150 then windows and zero pads the $i^{th}$ digitized difference data at step 202 and a fast Fourier transform (FFT) is performed using the $i^{th}$ windowed zero-padded difference data at step 204 according to the processing techniques described in *Digital Signal Processing*, cited above. A Tukey window is used in order to suppress any interfering tones and to reduce bias as a consequence of the $i^{th}$ difference signal being available to be sampled only for a finite duration which is approximately the chirp duration T as discussed above. Tukey windows are also discussed in *Digital Signal Processing*. The FFT data is squared at step 205 and searcher 150 then selects the maximum of the squared FFT data and one point on each side of the maximum point at step 206. Searcher 150 then performs quadratic interpolation at step 208 using the 3 points from step 206 to provide a coarse estimate of the peak difference frequency $F_{Di}$.

Figure 11A:
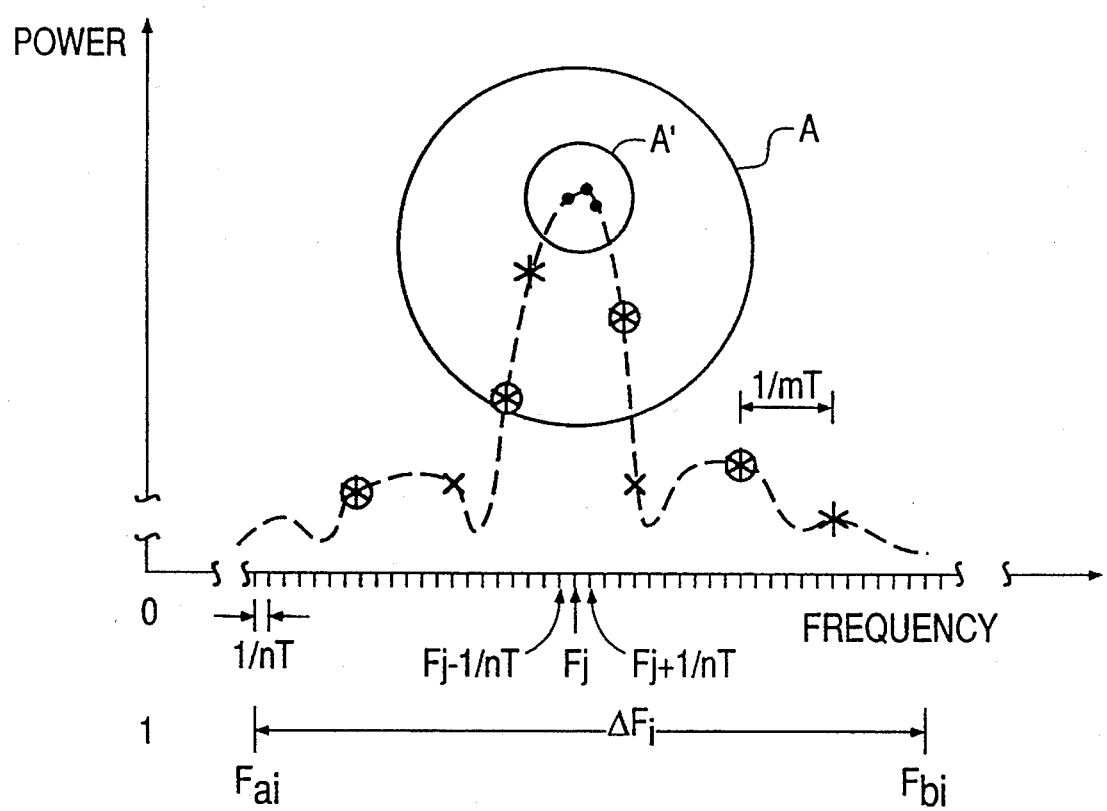
FIG. 11a shows the difference signal after zero padding, Fourier transformation and amplitude squaring

FIG. 11a shows the plot of amplitude versus frequency after performing the FFT of step 204 and the magnitude squaring of step 205. In general, for an observation time T, zero-padding by a factor of m increases the resolution from 1/T to 1/mT. The asterisks "*" with no circles correspond to $i^{th}$ Fourier transformed difference data absent zero-padding. The asterisks with circles together with the asterisks without circles represent the Fourier transformed zero-padded data resulting from step 204. Here, the resolution of the spectrum was doubled because the number of zeros added to the difference data was chosen to be $N_s$ (the number of sample points). This guarantees that 4 FFT points lie on the main lobe of the Fourier transformed difference signal and therefore that there will always be 3 points on the main lobe which can be used in quadratic interpolation step 208. Since the time available for sampling the $i^{th}$ difference signal is approximately T=1 ms and the $i^{th}$ difference signal is sampled for the entire time it is available to be sampled (approximately T as discussed above), the FFT output at step 204 has a resolution of ½ T=500 Hz, that is, the peak frequency of the difference signal $F_{Di}$ can be determined to within 500 Hz. However, the signal-to-noise density ratio of the target and reference IF signals (Equations 7b and 8b, respectively) as well as estimation error Equations 7a, 8a and 9 indicate that the difference frequency $F_{Di}$ can be determined to much higher accuracies (e.g. <1 Hz). Therefore, after the magnitude squaring step 205 is performed, quadratic interpolation step 206 is used to obtain a coarse estimate of difference frequency $F_{Di}$.

Figure 11B:
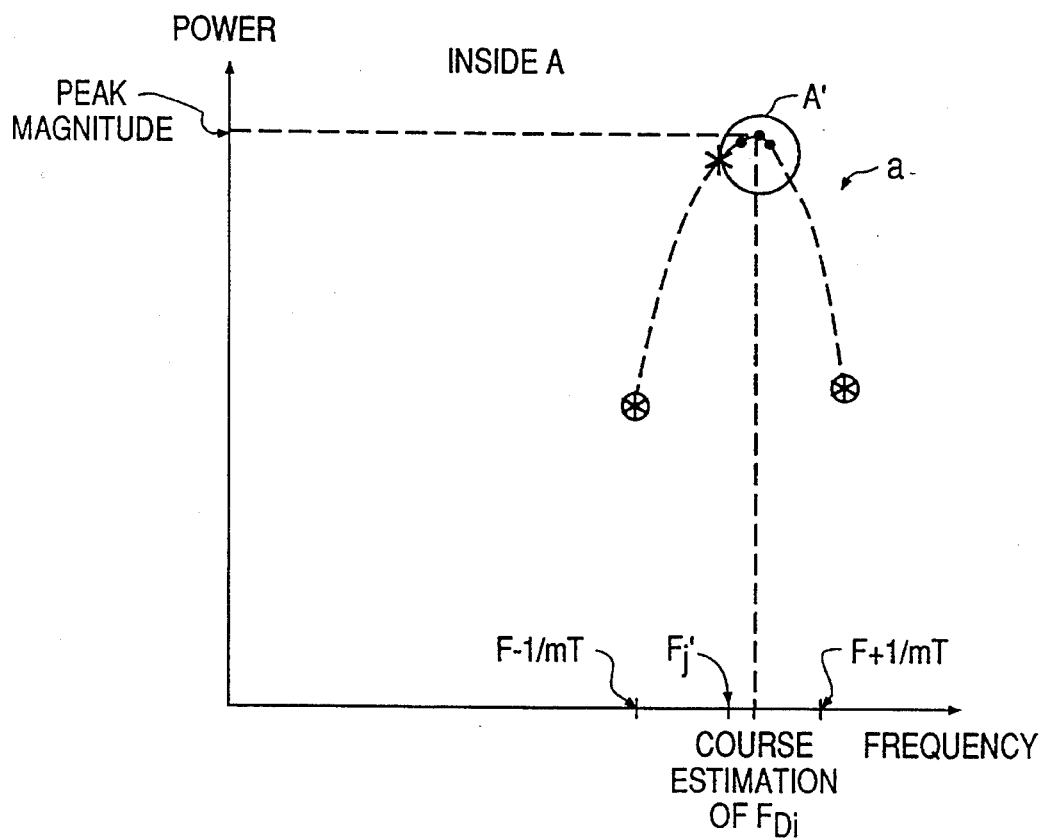
FIGS. 11b and 11c show the peak of the difference signal after performing a quadratic fit corresponding to steps 206 and 224, respectively, of FIG. 10.

Once searcher 150 has output the coarse estimation of the difference frequency $F_{Di}$, it goes into the tracking mode as shown in FIG. 10. The first time through steps 220–224 (the tracking mode) tracker 160 uses the same set of $i^{th}$ difference data used in the searching mode together with the coarse estimate of difference frequency $F_{Di}$ to determine a fine estimate of difference frequency $F_{Di}$. In particular, at step 222, the coarse estimation of the difference frequency $F_{Di}$ from searcher 150 (step 208) is used together with the initial set of $i^{th}$ digitized difference data obtained at step 220 to calculate three discrete Fourier transform (DFT) points. FIG. 11b shows inside circle A of FIG. 11a containing the 3 squared zero-padded windowed FFT difference data. Quadratic interpolation step 208 involves calculating the location of the peak of the hypothetical quadratic "a". The coarse estimation of the difference frequency $F_{Di}$ is the frequency which corresponds to this location. Steps 223 and 224 are similar to steps 205 and 208, respectively, but uses the three DFT points in circle A' (see FIG. 11c) rather than the three points in circle A (see FIG. 11b). The bandwidth ΔFi corresponding to a full stroke Li is divided into J frequency bins of width 1/(nT) where n and J are integers and J/(nT)= ΔFi. The coarse estimate of the difference frequency $F_{Di}$ is used to determine which of all J possible frequencies is closest to the coarse estimate of the difference frequency $F_{Di}$. Since the frequency locations Fj are fixed, two weighing vectors Sj and Cj of dimension Ns (number of sample points) for each location Fj can be determined in advance and permanently stored in processor 140. Processor 140 can store the weighing vectors Sj and Cj corresponding to all J frequency locations Fj i=1. . . J in advance. Then calculations of the 3 DFT points (step 222) only involves six dot products of each of the vectors (Sj−1, Cj−1) (Sj, Cj) and (Sj+1, Cj+1) with data Ai output from step 220. Once the fine estimate of difference frequency $F_{Di}$ and the corresponding amplitude is obtained, built in test step 225 is used to determine the quality of the estimate of $F_{Di}$. The last good estimate of $F_{Di}$ is output to flight controller 8, steps 220–225 are repeated, but with tracker 160 receiving a new set of $i^{th}$ digitized difference data.

Figure 11C:
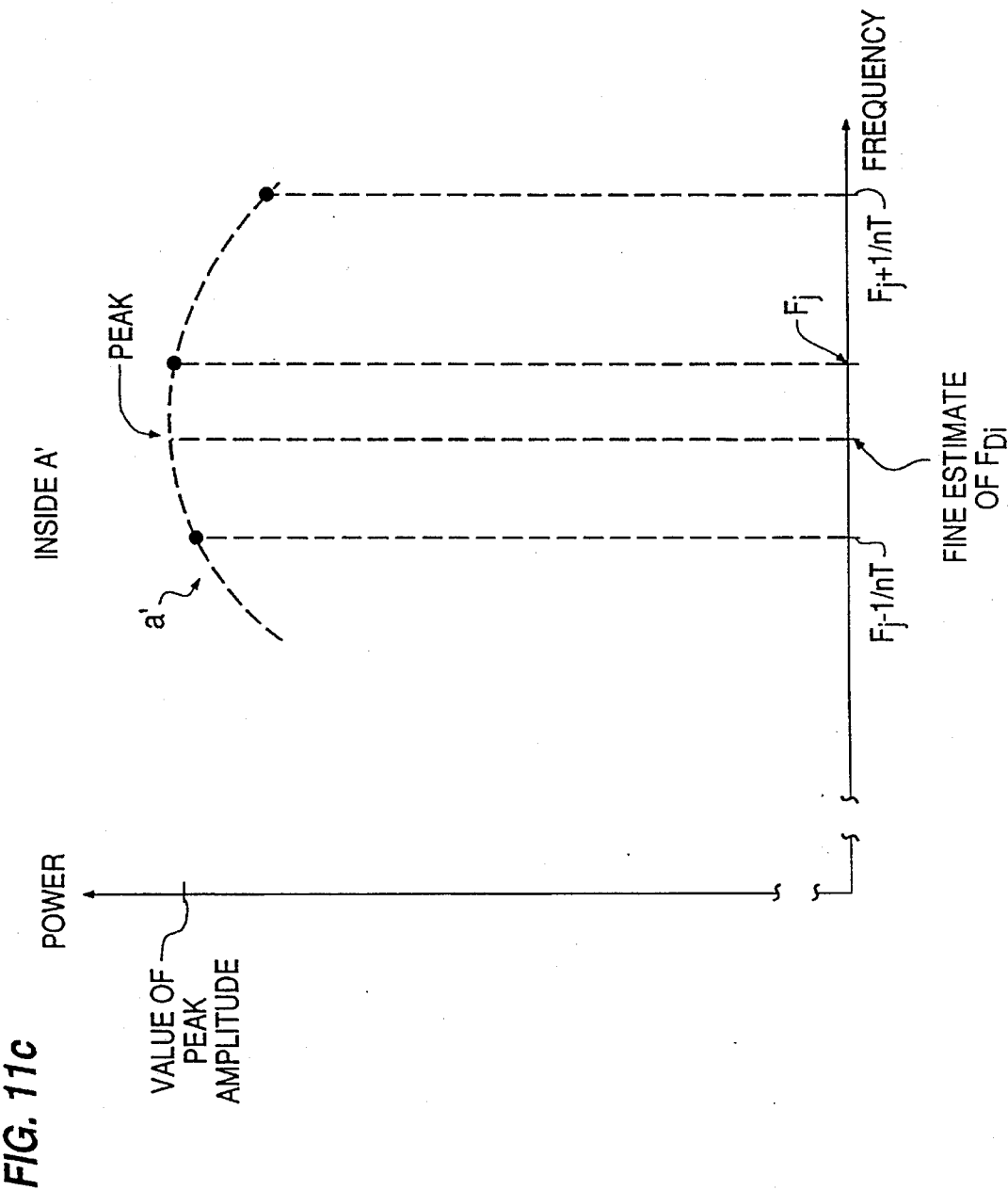

The 3 points in circle A' in FIG. 11a are shown as large dots in FIG. 11c. The curve a' formed by dashed lines represents a hypothetical quadratic function defined by the three points in circle A'. Quadratic interpolation step 208 involves calculating (estimating) the location of the peak of the hypothetical quadratic a'. If the frequency spacing from padding step 202 is 1/10 T=100 Hz (i.e., n=10) and a Tukey window is used, then quadratic interpolation step 208 results in a worst case difference frequency estimation error for $F_{Di}$ of less than *1 Hz for tones greater than or equal to 20 kHz. For B=6 GHz this corresponds to a worst case position error of 1/40 mm=25 micrometers. Finally, if the stroke length Li=50 cm, then bandwidth $\Delta F_i$=20 kHz and the total number J of frequency bins $F_j$ is 200.

Step 225 includes checking the quality of the estimation of the difference frequency. This can be done by using the value of the amplitude of the quadratic interpolation estimate of $F_{Di}$. If the amplitude changes by more than a predetermined amount, for example, 10% of the amplitude of the last good estimate of $F_{Di}$, then the measurement may be invalid. In such a case, the previous estimate of $F_{Di}$ is used in step 222 rather than the current estimate.

Tracker 160 repeats steps 220–225 at rates corresponding to position update rate $R'_i$. In addition, step 222 of tracker 160 can be performed in a much shorter time than step 204 of searcher 150 because step 204 requires approximately $pN_s \log_2 pN_s$ calculations, whereas step 222 requires approximately $6N_s$ calculations where $N_s$ is the number of sample points and p is an integer corresponding to the number of sets of $N_s$ zeros which are added to the original Ns sample points. This enables digital processor 140 to output frequency $F_{Di}$ with high accuracies (δFi of less than 1 Hz) over a bandwidth δFi of 20 kHz corresponding to stroke length Li of 50 cm with lag time $T_{Li}$ less than 0.5 ms. Lag time $T_{Li}$ can be reduced to nearly zero by performing dot products on the incoming data as it is being collected.

Figure 12A:
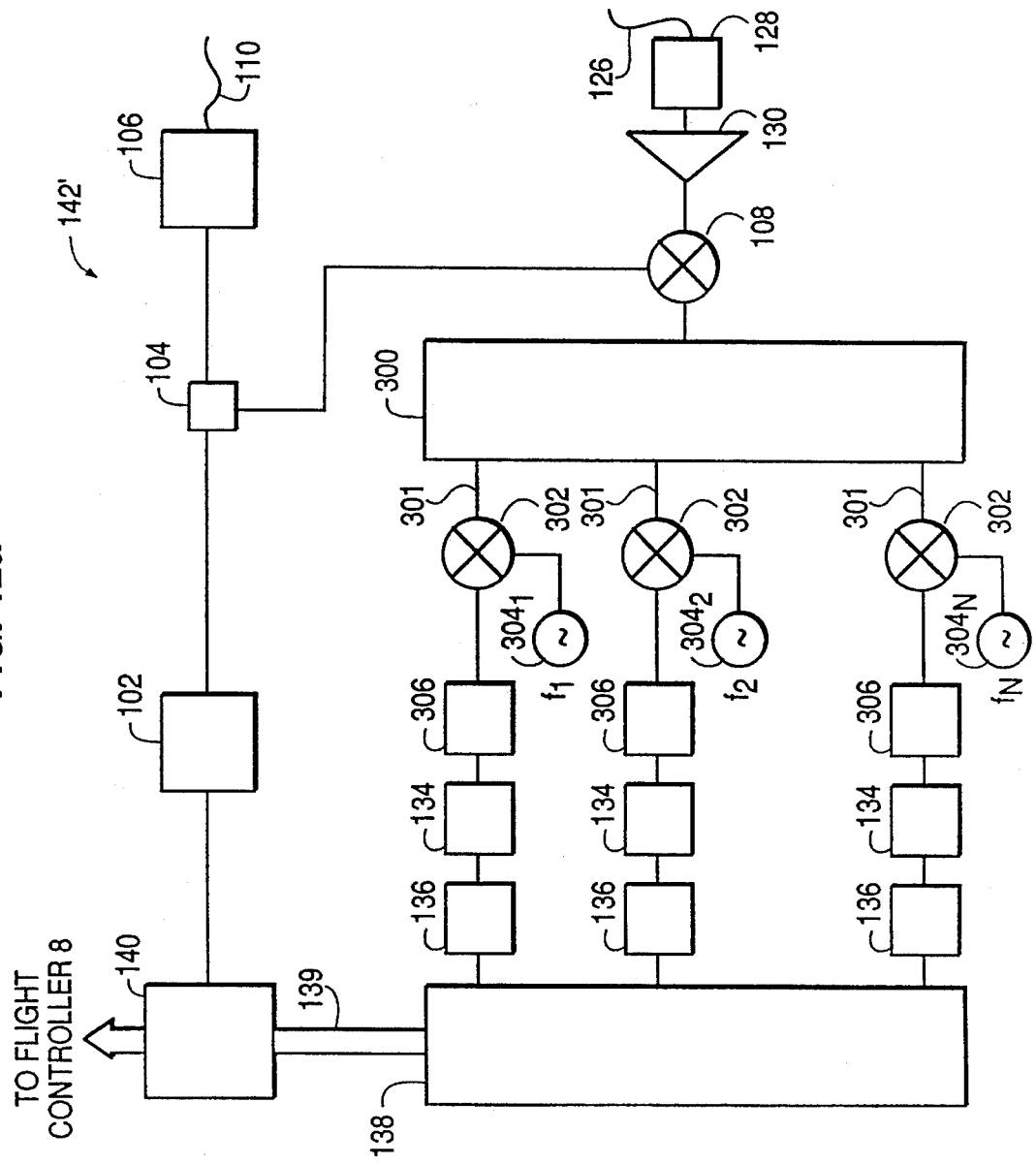
FIGS. 12a and 12b are block circuit diagrams of other embodiments of an optical sensing system employing principles according to the invention.

FIG. 12a is a schematic diagram of a second embodiment of the invention with an active electronics unit 142' corresponding to active electronics unit 142 in FIG. 3. Like elements in FIGS. 3 and 12a have corresponding reference numerals. In this second embodiment, RF mixer 108 outputs the N IF target signals and N IF reference signals to an N-way RF power splitter 300 which has N RF outputs 301. Each of N RF outputs 301 has all 2 N IF signals but at reduced power levels.

The 2N RF outputs 301 are input to N mixers 302, each of which is mixed with a mixing frequency fi from signal generators $304_i$ where i=1, . . . , N. The frequencies fi of each of signal generators $304_i$ are chosen so that RF mixers 302 output N frequency shifted target IF signals and N frequency shifted reference IF signals with frequencies $F_{Ti}$ and $F_{Ri}$, respectively. Filters $306_{1-N}$ receive the N frequency shifted target IF signals and N frequency shifted reference IF signals. Each mixing frequency fi output by signal generator $304_i$ is chosen so that the corresponding $i^{th}$ frequency $F_{Ti}$ of $i^{th}$ frequency shifted target IF signal and frequency $F_{Ri}$ of $i^{th}$ frequency shifted reference IF signal is passed by the $i^{th}$ filter 306.

N non-linear devices 134 receive and square the filtered N frequency shifted target and N frequency shifted reference IF signals and each non-linear device 134 outputs a sum and difference signal with frequencies $F_{Si}$ and $F_{Di}$, respectively, for each of N position sensor heads 116. Finally, audio low pass filters 136 pass only the difference signals with peak frequencies $F_{Di}$ to A/D converter 138, and digital processor 140 searches and tracks successive peak frequencies $F_{Di}$ as discussed above.

Figure 12B:
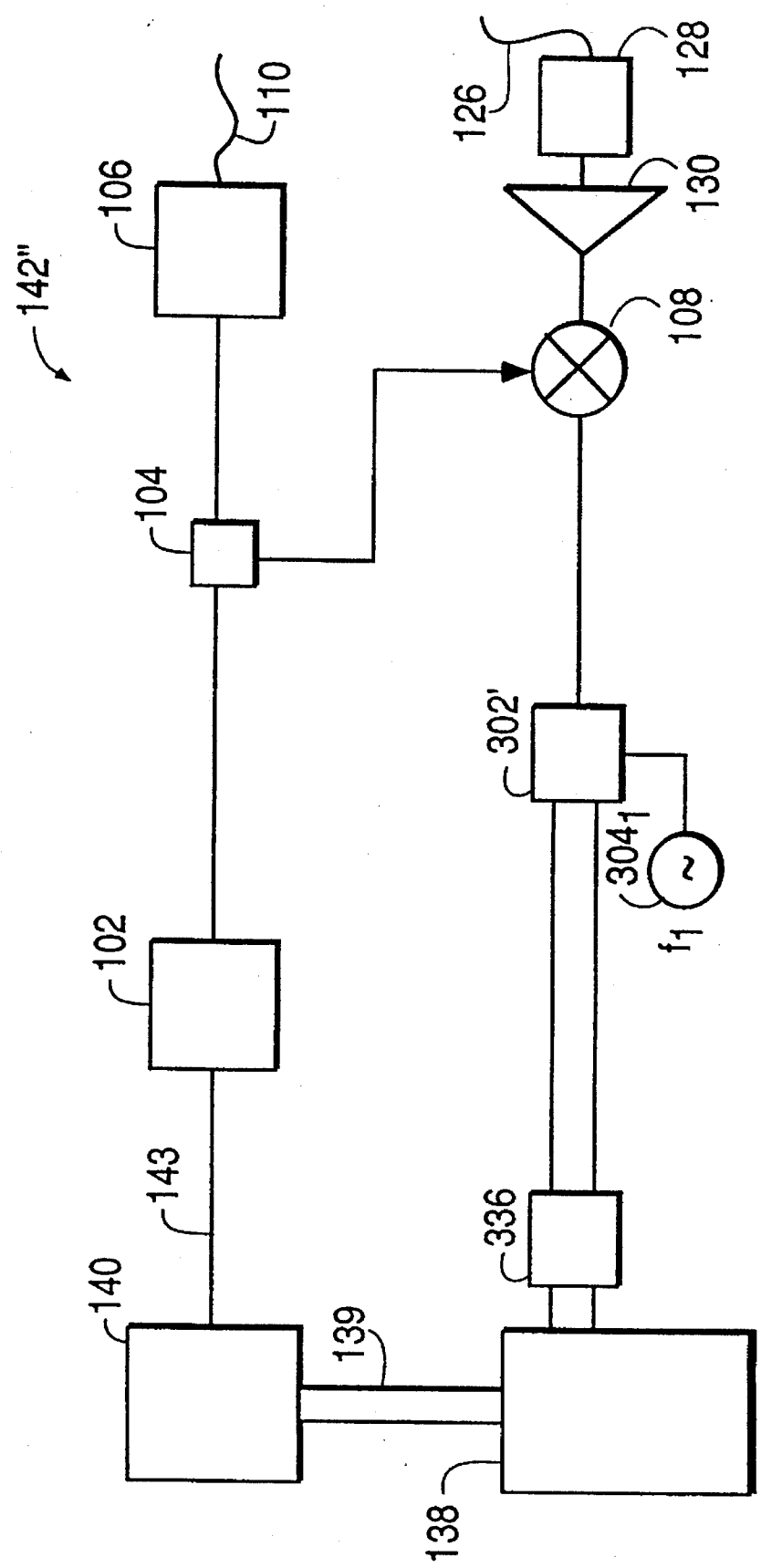
Figure 13A:
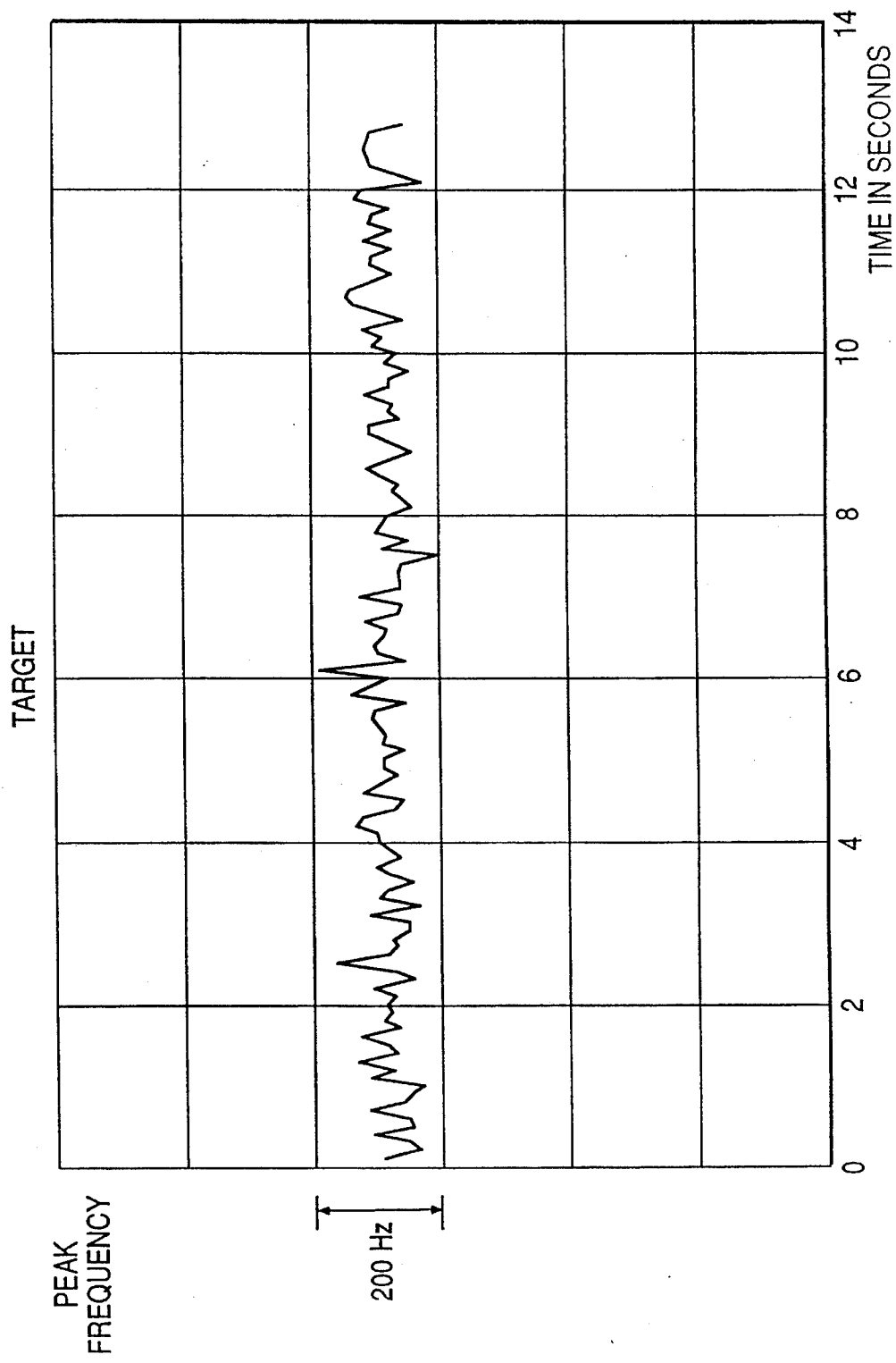
FIGS. 13a–13c show a series of actual output data for a fiber optic sensor system according to the invention.
Figure 13B:
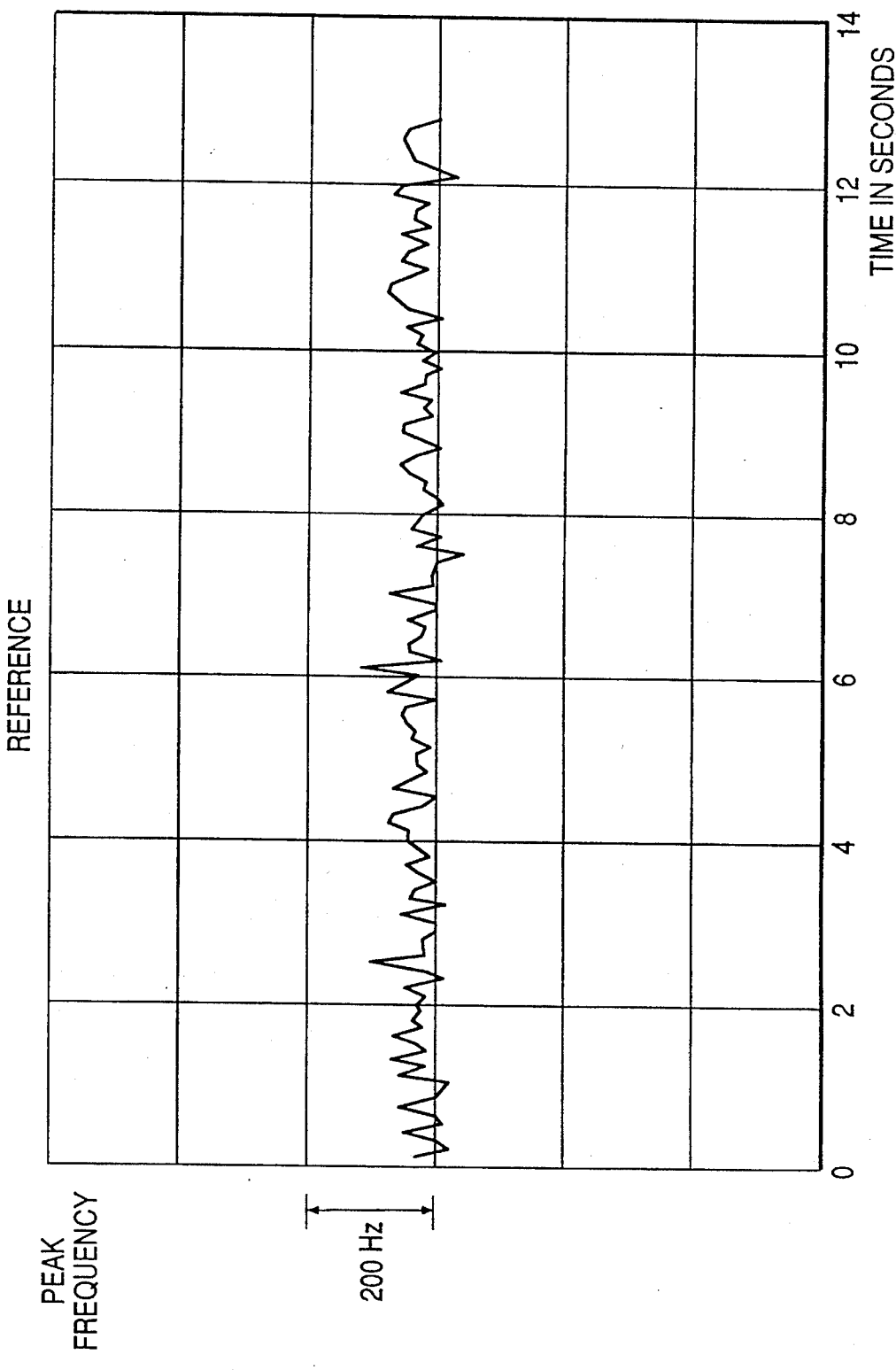
Figure 13C:
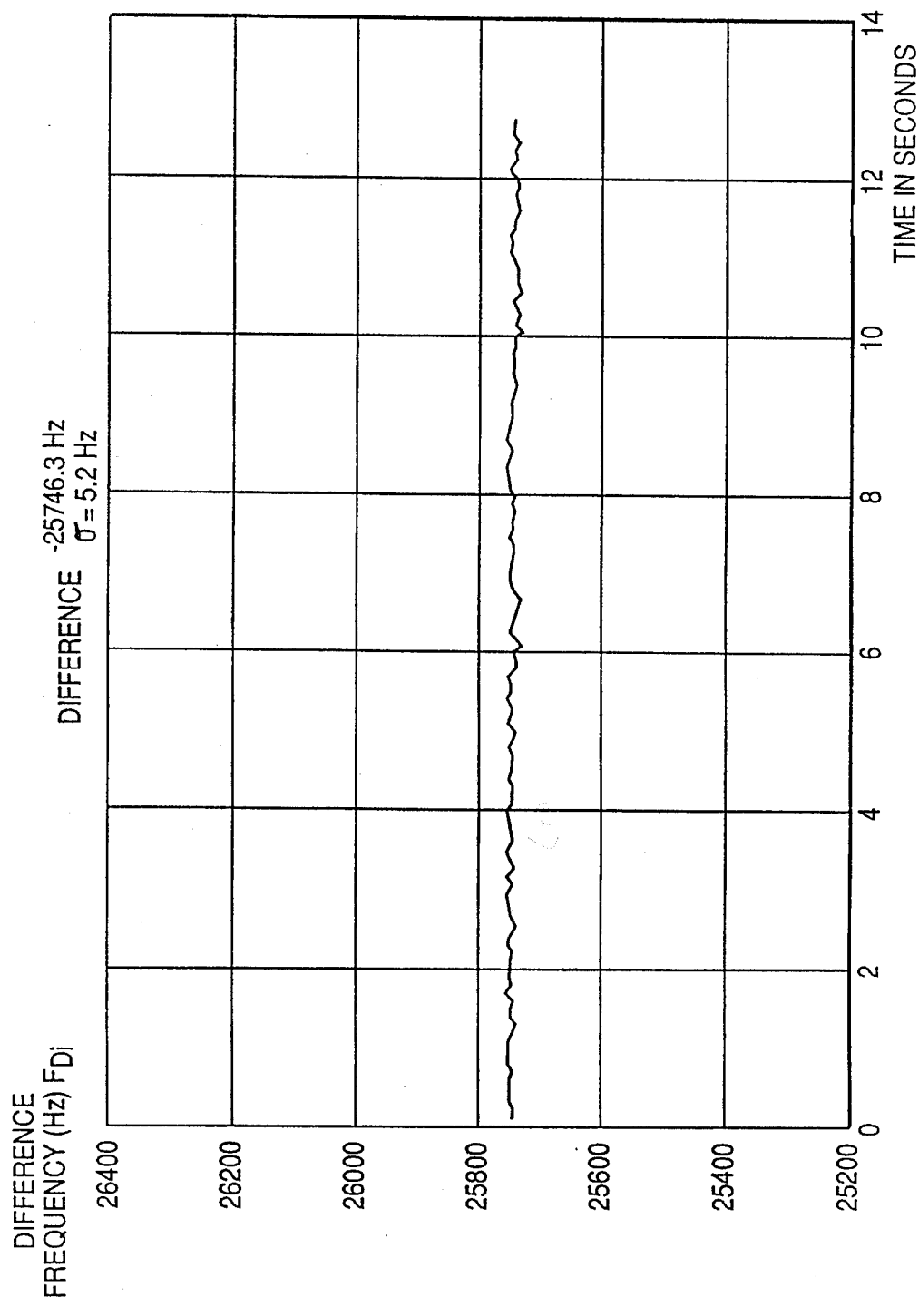

FIG. 12b shows an actual setup of a fiber optic sensing system employing principles of the invention, at a fixed temperature and no vibrations using a chirped bandwidth of B=6 GHZ, chirp duration T=1 ms and update rate $R'_i$=10 Hz. Here, however, an IQ demodulator 302' or quadrature mixer RR-48 by KDI/Triangle Electronics was used. IQ demodulator 302' has two outputs, one corresponds to the signal output by mixers 302 in FIG. 12a and the other corresponds to that same signal shifted in phase by 90 degrees. These signals are filtered by IQ filters 36 and sampled by A/D converter 138. One linear position sensor head 116 was used along with active electronics unit 142'' without non-linear devices 134. FIGS. 13a–13c show a series of actual output data for a fiber optic sensing system of FIG. 12b. In this case, since the peak frequencies $F_{T1}$ and $F_{R1}$ were fairly well defined, it was possible to simply subtract the peak frequency $F_{T1}$ from the peak frequency $F_{R1}$ to obtain difference frequency $F_{D1}$.

FIG. 13a shows a series of 130 actually measured peak target frequencies $F_{T1}$. An average target IF peak frequency, $aveF'_{T1}$ was measured with an RMS error of $\delta F_{T1}$=28.8 Hz, which corresponds to a target measurement error (position measurement accuracy) $\delta L_{T1}$ of 0.72 mm.

FIG. 13b shows a corresponding frequency versus time graph of 130 actually measured peak reference frequencies $F_{R1}$. An average reference IF peak frequency, $aveF'_{R1}$ IF was measured with an RMS error of $\delta F_{R1}$=28.0 Hz which corresponds to a measured-reference position error (position measurement accuracy) $\delta L_{R1}$ of 0.7 nun.

FIG. 13c shows the resulting difference frequencies $F_{D1}$. Here the difference frequency $F_{D1}$ is $F_{T1} - F_{R1}$, which yields an average difference frequency $aveF_{D1}$ of 25,746.3 Hz. The average difference frequency, $aveF_{D1}$=25,746.3 Hz had an RMS error (position measurement accuracy) $\delta F_{D1}$ of 5.2 Hz which corresponds to a relative target position error of $\delta L_{S1}$=0.13 mm.

According to equation 9, if the target error and reference error are independent of each other, the expected error $\delta L_{Si}$ should be $$\delta L_{S1}=[(0.7)^2+(0.72)^2]^{1/2}=1.0 \text{ mm}.$$

However, since the target position error $\delta L_{Si}$ was measured to be 0.13 mm, errors in the target position and reference position are not independent of each other, and consequently contributions to errors $\delta F_{T1}$ and $\delta F_{R1}$ due to non-repeatability in the RF chirps are significantly reduced.

Estimation of the actual difference frequency of the difference signal shown in FIG. 8 was achieved using active electronics unit 142 in FIG. 1b, i.e., using non-linear devices 134. Here, with T=1 ms, B=6 GHz, $R_i$=250 Hz, $T_L$=100 microseconds and with the difference signal having approximately the same signal-to-noise density ratio as the previous example, an rms position error of 50 micrometers was achieved. Therefore, in addition to cancelling non-repeatability of chirp slope from RF chirp source 102, errors due to non-linearities in each individual chirp were also significantly reduced.

Figure 14:
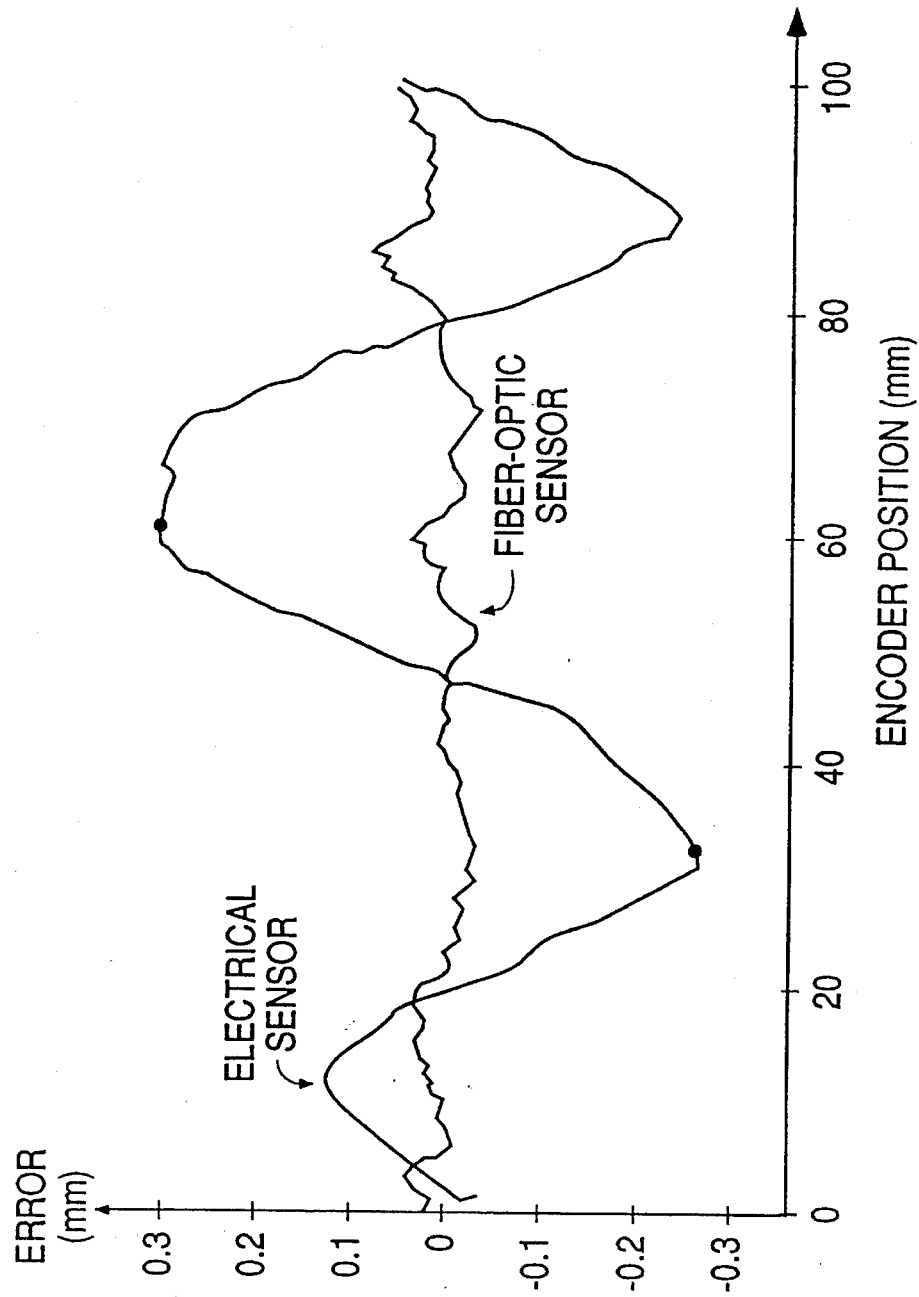
FIG. 14 shows a series of bias errors from a fiber optic sensor system as compared to an electric sensor.

FIG. 14 shows a plot of bias errors in position measurements by a fiber optic sensing system employing principles of the invention (including non-linear devices 134) compared to bias errors in position measurements by an electronic sensor. The target was moved 100 mm in known increments and its position measured while at rest. Here, the chirp bandwidth B=6 GHz, chirp duration T=1 ms, update rate $R'_i$=250 Hz and a lag time $T_{Li}$=100 microseconds. The RMS error of the fiber optic sensing system with one sensor head 116 was measured to be 25 micrometers. The RMS error for the fiber optic sensing system was measured to be 45 micrometers when optical losses resulting from N=6 sensor heads 116 were introduced.

Figure 15:
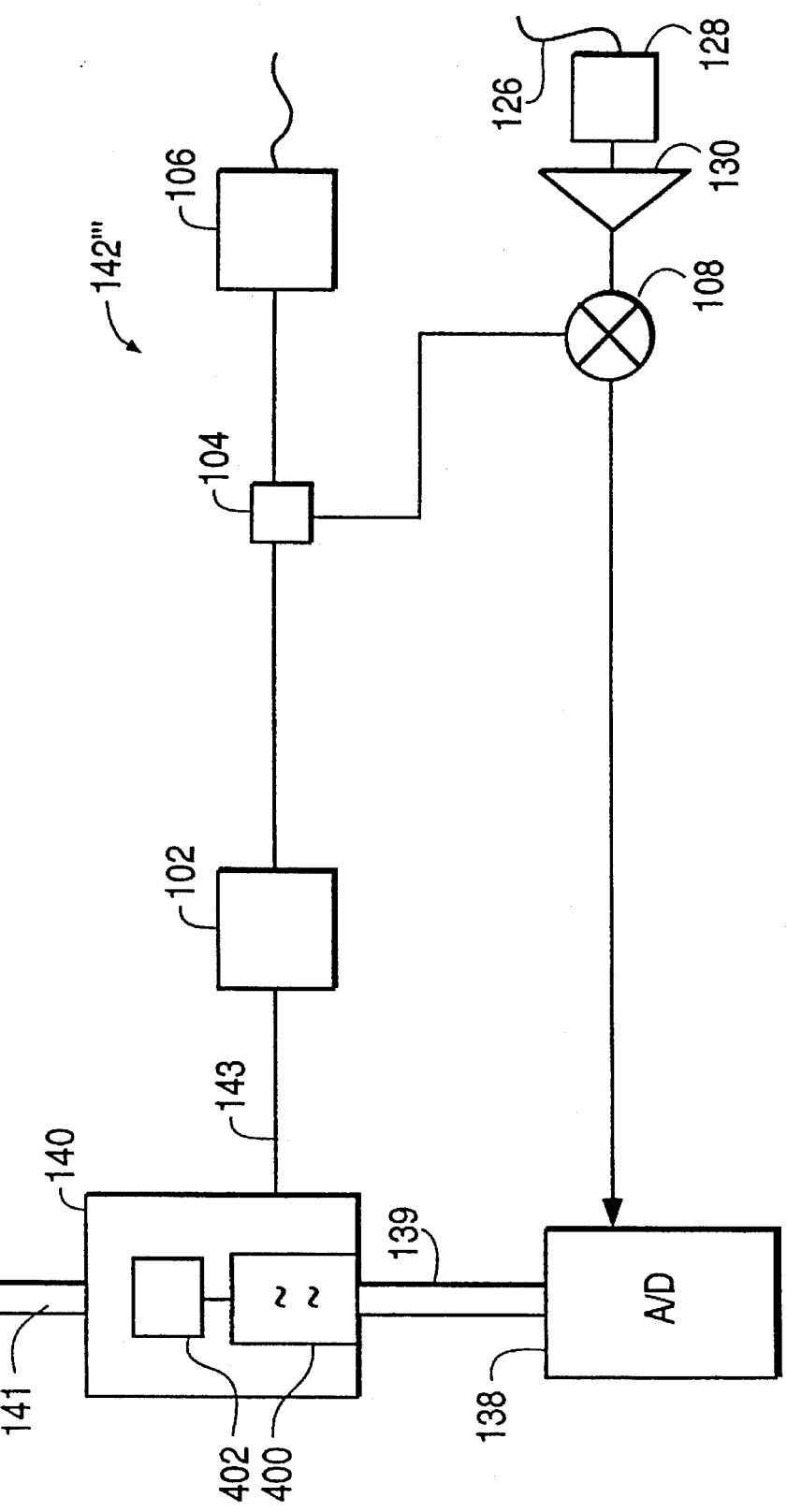
FIG. 15 is a block circuit diagram of another embodiment of the invention utilizing digital filtering and squaring.

Finally, it should be noted that the squaring accomplished by non-linear devices 134 can be done digitally. FIG. 15 is a block circuit diagram of an embodiment of active electronics unit 142''' with a digital filter 400 and a digital squaring unit 402. Digital filter 400 and digital squaring unit 402 can be implemented using specifically designated hardware or using software with digital processor 140. The sampled data from A/D converter 138 are input to filter 400 and filtered and then input to digital squaring unit 402 and squared. Then the difference signal of the squared digital data from digital squaring unit 402 is input to searcher 150 to acquire a coarse estimate of difference frequency $F_{Di}$ and then to tracker 160 for a fine estimate of the difference frequency $F_{Di}$. Hence, searcher 150 and tracker 160 operate in the same manner as described above.

Figure 16:
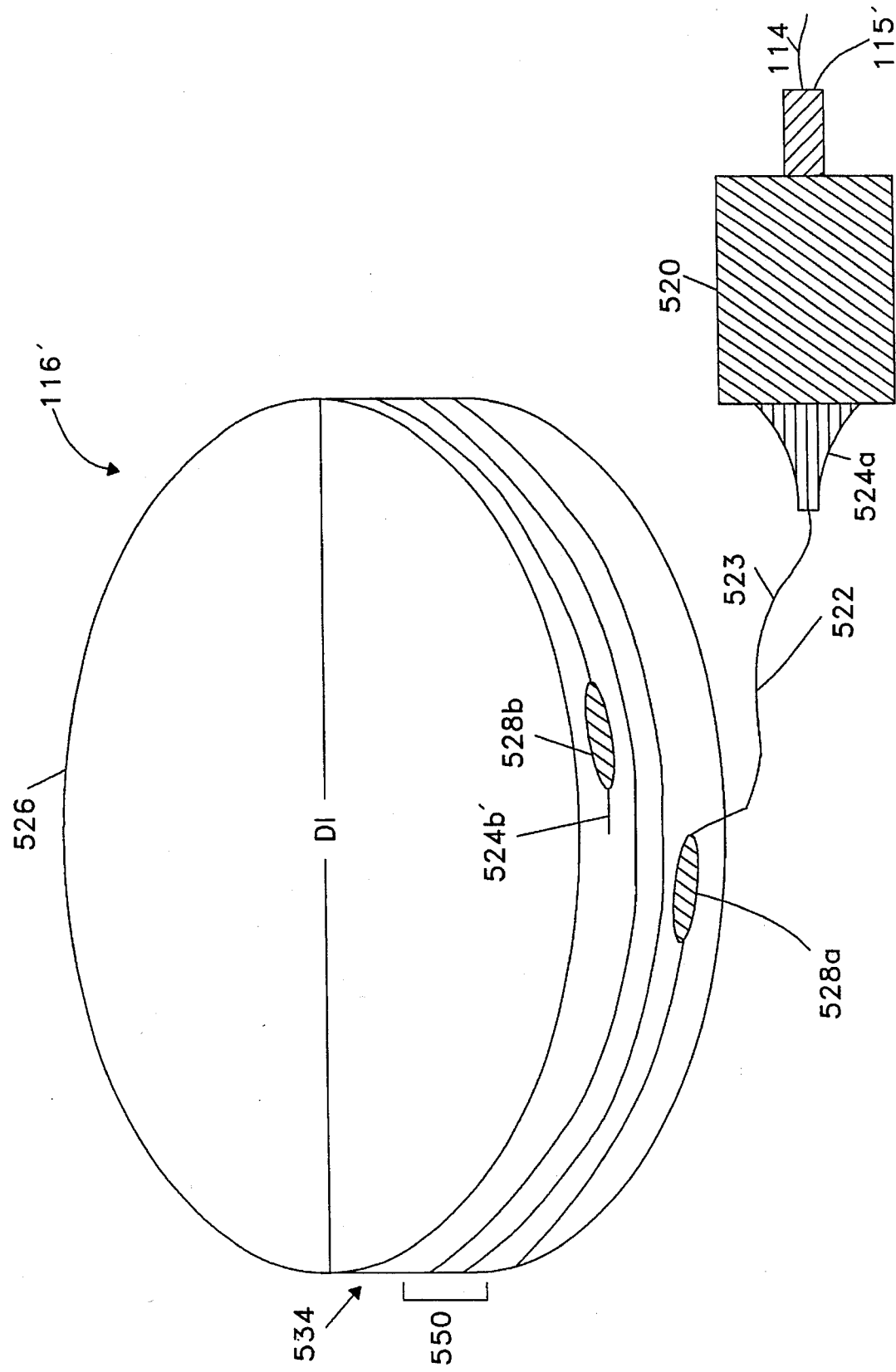
FIG. 16 shows a temperature sensor head having a temperature sensitive puck in accordance with one embodiment of the invention.

FIG. 16 shows one embodiment of a temperature sensor head 116' which can be connected to optical sensing system 100 like position sensor heads 116 in FIG. 3. Again, one of the N chirped IM optical signals is output by second transmitting fiber 114 to connector 520. Connector 520 couples the chirped IM optical signal from second transmitting fiber 114 to sensing fiber 522. Sensing fiber 522 is wrapped around the perimeter of a temperature sensing object such as a puck (or ring) 526 made of a material having a high coefficient of thermal expansion. Sensing fiber 522 can have a plastic covering 523 to strengthen and protect fiber 522 from any sharp edges or uneven surfaces in threads 550. Sensing fiber 522 has first and second ends or tips 524a and 524b, respectively, and is attached to puck 526 at first and second attachment points 528a and 528b, respectively. Threads 550 can be cut in perimeter 534 of puck 526 so that sensing fibers 522 remain securely positioned about puck 526.

Tip 115 of second transmitting fiber 114 (and/or first end 524a of sensing fiber 522) produces a chirped IM optical reference signal, and second end 524b of sensing fiber 522 produces a chirped IM optical target signal. Alternatively, the optical reference signal can be produced by fusion splicing second transmitting fiber 114 near tip 115 of fiber 114 or by using tip 115 itself. In either case, the chirped IM optical signal is scattered back through second transmitting fiber 114, optical coupler 112 and return fiber 126, until it is detected by photodiode receiver 128.

It is desirable to have the target and reference signals with approximately the same amplitudes. The amplitude of the reference and target chirped IM optical signals can be varied depending on how tips 115 (and/or 524a and 524b), respectively, are cleaved. For example, if tip 115 (and/or first end 524a) and tip 526 are cleaved at an angle with respect to a transverse cross section of second transmitting fiber 114, then the amplitude of the chirped IM reference and target signals, respectively, can be reduced. Also, tip 115 and/or 524a and 524b can have a coating 115' (and/or 524a) and 524b', respectively, of a dielectric such as titanium dioxide (TiO2) in order to increase the amplitudes of the reference and target chirped IM signals. As was the case with position sensor heads 116, effects due to vibrations and variations in the temperatures of fibers 110, 110', 114 and 126 can be minimized or eliminated by measuring and appropriately processing the target and reference peak frequencies, $F_{Ti}$ and $F_{Ri}$, respectively.

Puck 526 can be used to improve the sensitivity of temperature sensor head 116' to changes in temperature, (i.e., to increase the absolute value of $dF_{Di}/d(tmp)$). In order to do this, puck 526 should be made of a material with a high coefficient of thermal expansion. Also, it is preferable that the puck material linearly expands with temperature changes. However, puck materials that expand in a known manner for a given change in temperature can also be used.

The puck material should preferably have a high heat conductivity so that sensor head 116' will react quickly to temperature changes. Puck 526 should also be hard enough that it does not deform when fiber 522 is wrapped around it. One example of a suitable puck material is aluminum, which has a coefficient of thermal expansion of $23\times10^{-16}$ meters per degree Celsius (about 40 times that of glass). In this case, if the length of sensing fiber $L_{Si}$ is chosen to be about 1 meter, then $dF_{Di}/d(tmp)=1.78$ Hz per degree Celsius. This increases the sensitivity of sensor lead 116' to changes in temperature by a factor of 4.45 compared to the sensitivity of sensor head 116' with no puck 526.

Figure 17A:
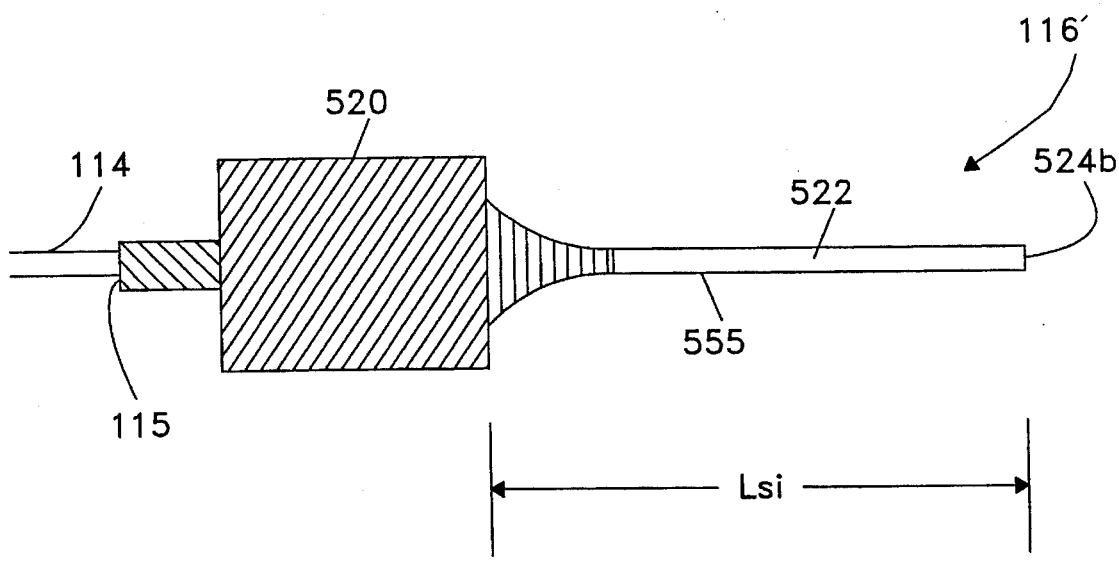
FIG. 17a and 17b show side and cross sectional views, respectively, of temperature sensor head 116' according to another embodiment of the invention.
Figure 17B:
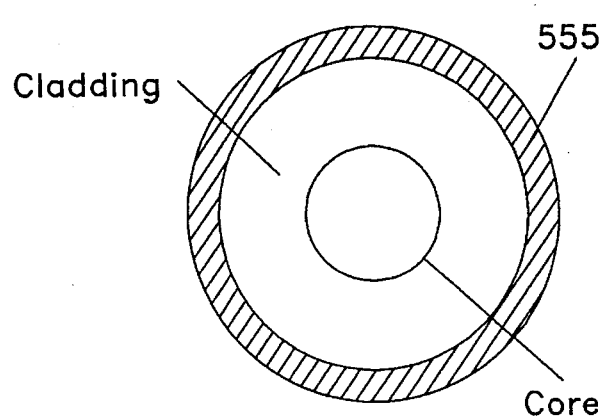

FIG. 17a and 17b show side and cross sectional views, respectively, of temperature sensor head 116' according to another embodiment of the invention. Here, sensing fiber 522 is coated with a coating 555 and no puck is used. Coating 555 can also be aluminum or some other temperature sensitive material. Aluminum coated optical fibers are commercially available, e.g., Fiberguide Industries, Stirling, N.J.

Experimental Result

Figure 18:
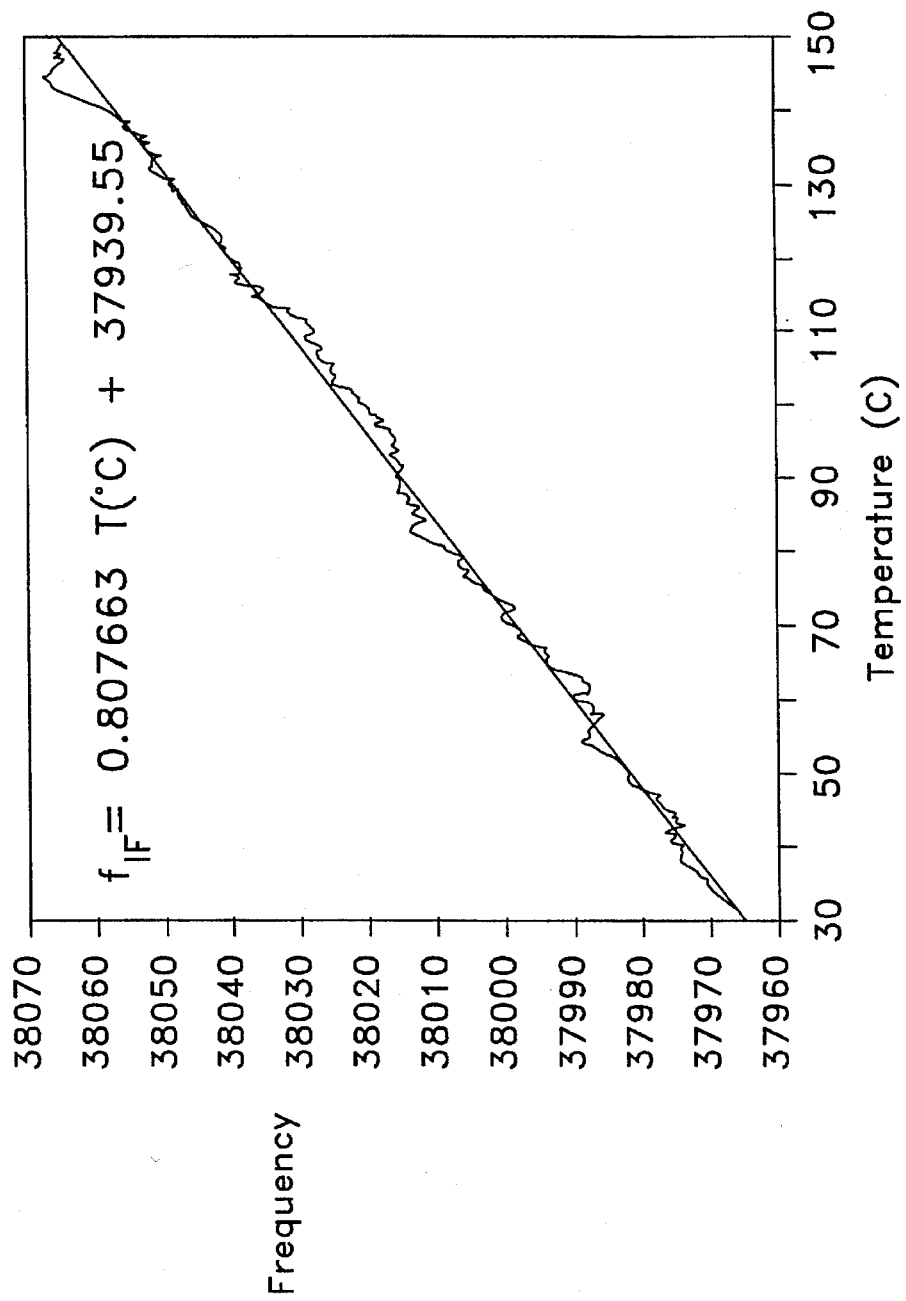
FIG. 18 is a plot of frequency versus ambient temperature from 30 to 150 degrees Celsius achieved using the temperature sensor of FIG. 16.

FIG. 18 is a plot of frequency versus ambient temperature from 30 to 150 degrees Celsius. Temperature sensor head 116' in FIG. 16 was used in optical sensing system 100 of FIG. 3. A ⅔ meter graded index $^{50}/_{125}$ micrometer multimode fiber was used as sensing fiber 522. An aluminum puck of 1.5" diameter and 0.2' height was used as puck 526. Sensing fiber 522 was wrapped around puck 526 in accordance with FIG. 16. Tip 524b of sensing fiber 522 was uncoated yielding a 4% reflection at the glass/air interface. A 10% reflective coating at tip 115 served as the reference reflector. Puck 526 had threads 550 and fiber 522 was wound with approximately 1 pound of tension at room temperature. Temperature sensing fiber 522 was attached to puck 526 at attachment points 528a and 528b using epoxy. Sensing fiber 522 also had a soft plastic buffer layer serving as plastic covering 523 which protected fiber 522 from any small metal shavings or uneven surfaces which could cause fiber 522 to crack.

Puck 526 was then placed in an oven which was heated at 2 degrees Celsius per minute. Optical sensing system 100 estimated $F_{Di}$ 250 times per second. These estimates were averaged every 2 seconds to obtain each recorded point on the plot of FIG. 18. The temperature sensitivity $dF_{Di}/d(tmp)$ (the slope of the line in FIG. 18) was determined to be about 0.8 Hz per degree Celsius. This measured temperature sensitivity is less than the theoretically predicted value of 1.2 Hz per degree Celsius, the difference likely being due to a constrictive effect of the soft plastic buffer layer on fiber 522.

Figure 19:
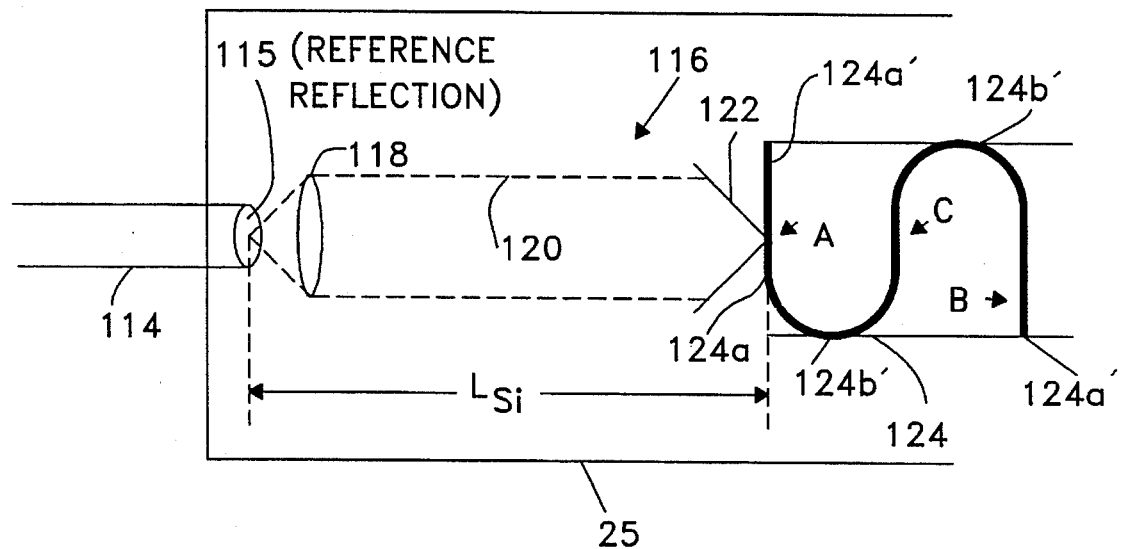
FIG. 19 shows another embodiment of the invention utilizing a bi-metallic temperature sensitive strip.

FIG. 19 shows another embodiment of the invention utilizing a bi-metallic temperature sensitive strip 124' with a first metal 124a' and a second metal 124b'. Bi-metallic temperature sensitive strip 124' can be a thermostat metal made of composite metals. Bi-metallic temperature sensitive strip 124 is affixed at point A to retro-reflector 122 and at point B to an object (not shown) fixed in position with respect to fiber tip 115. Bi-metallic temperature sensitive strip 124' is reversed at point C (i.e., first metal 124a' is above second metal 124b' to the left of point C but is below second metal 124b' to the right of point C) in order to keep the motion of the retro-reflector along the axis of optical beam 120. If the conversion of temperature to position is too non-linear for a given application, a look-up table can be used to compute corrections. In this embodiment, as the temperature of bi-metallic sensitive strip changes, the relative position of retroreflector 122 shifts either left or right resulting in a shift in $L_{Si}$. The value of $L_{Si}$ is in turn determined in the same manner as discussed above with respect to the position sensor.

Position measurements (the $L_{Si}$) can be converted to temperature measurements in at least one of two manners. If the conversion from position to temperature is linear, the position measurements can be directly converted to temperature measurements. If the conversion of temperature to position is too non-linear for a given application, a look-up table can be used to compute corrections.

Numerous and additional modifications and variations of the present invention are possible in light of the above teachings. It is therefore to be understood that within the scope of the appended claims, the invention may be practiced otherwise than as specifically claimed.

What is claimed is:

1. An optical sensing system for sensing the temperature at a first location, comprising:

electro-optical means for outputting a modulated optical signal and a chirped rf signal, the envelope of the modulated optical signal having a phase that has a known relation to the phase of the chirped rf signal;

light guide means coupled to said electro-optical means for receiving and transmitting the modulated optical signal along an optical path;

temperature sensing fiber optically coupled to said light guide means and having a first end and a second end, said first end having an associated reference reflector and said second end having an associated target reflector, said temperature sensing fiber receiving said modulated optical signal at said first end and guiding said modulated optical signal along a temperature sensing optical path within said first and second ends, wherein said reference reflector reflects a portion of said modulated optical signal as a reference optical signal and said target reflector reflects a portion of said modulated optical signal as a target optical signal;

transducing means, having an output and two inputs, coupled to said temperature sensing optical fiber, one of the two inputs being electrically coupled to said electro-optical means for receiving the chirped rf signal and the other of the two inputs being optically coupled to said light guide means for receiving the reference optical signal and the target optical signal having first and second time delays with respect to the chirped rf signal, respectively, said transducing means producing at its output a multi-frequency electrical signal which includes a first frequency corresponding to the first time delay a second frequency corresponding to the second time delay; and temperature detecting means coupled to the output of said transducing means for processing the multi-frequency signal and determining a difference frequency corresponding to the difference between the first frequency and the second frequency and representing the temperature at said first location.

2. The optical sensing system as claimed in claim 1, further comprising a temperature sensitive object, wherein said temperature sensing fiber is attached to said temperature sensitive object at first and second attachment locations so that a change in the temperature of said temperature sensitive object causes said second time delay to vary in accordance with variations in size of said temperature sensitive object.

3. The optical sensing system as claimed in claim 1, wherein said temperature sensing fiber is coated with a temperature sensitive material.

4. The optical sensing system as claimed in claim 1, wherein said second end of the temperature sensing fiber comprises said target reflector.

5. The optical sensing system as claimed in claim 4, wherein said second end of the temperature sensing fiber has a reflective coating.

6. The optical sensing system as claimed in claim 1, wherein said first end of the temperature sensing fiber comprises said reference reflector.

7. The optical sensing system as claimed in claim 1, wherein said first end of the temperature sensing fiber has a reflective coating.

8. The optical sensing system as claimed in claim 1, wherein a plurality of temperatures are to be sensed at a plurality of locations including said first location, further comprising:

a plurality of temperature sensing fibers including said temperature sensing fiber and other temperature sensing fibers, said plurality of temperature sensing fibers arranged at the plurality of locations and coupled to said optical coupling means, wherein the multi-frequency electrical signal output by said transducing means includes a plurality of pairs of first and second frequencies, and said temperature detecting means determines a plurality of difference frequencies from the multi-frequency electrical signal, each difference frequency corresponding to the difference between the first and second frequencies of a respective pair of first and second frequencies and each difference frequency representing the temperature at a respective one of said plurality of locations.

9. In an aircraft including a flight controller for controlling flight of the aircraft, the combination comprising:

electro-optical means for outputting a modulated optical signal and a chirped rf signal, the envelope of the modulated optical signal having a phase that has a known relation to the phase of the chirped rf signal;

light guide means coupled to said electro-optical means for receiving and transmitting the modulated optical signal along a plurality of optical paths;

a plurality of temperature sensor heads arranged at a plurality of locations and a plurality of position sensor heads, each temperature sensor head having a temperature sensing fiber and each position sensor head having a displaceable object, one of said plurality of temperature sensor heads and position sensor heads being disposed in one of said plurality of optical paths, wherein each temperature sensor head receives the modulated optical signal and provides a respective temperature target optical signal and temperature reference optical signal, and each position sensor head receives the modulated optical signal and provides a respective position target optical signal and position reference optical signal;

position and temperature detecting means having an input optically coupled to said light guide means and having another input electrically coupled to said electro-optical means for receiving the chirped rf signal at said another input and for receiving the position target optical signals and position reference optical signals as well as the temperature target optical signals and temperature reference optical signals and outputting position signals and temperature signals; and processing means for processing the position signals and the temperature signals and outputting to the flight controller a plurality of position values associated with respective positions of the displaceable objects and temperature values associated with the temperatures at the plurality of locations.

10. The optical sensing system as claimed in claim 1, wherein said electro-optical means comprises;

rf source means for producing the chirped rf signal; and controllable light source means having a modulating input coupled to the chirped rf signal for producing the modulated optical signal.

11. The optical sensing system as claimed in claim 1, wherein said light guide means comprises multimode fiber.

12. The optical sensing system as claimed in claim 10, wherein said rf source means comprises:

means for creating a digital signal representing the chirped rf signal; and digital-to-analog converter means, connected to said controllable light source means, for converting said digital signal into said chirped rf signal.

13. The optical sensing system as claimed in claim 12, wherein said temperature detecting means further includes processing means connected to said analogue-to-digital converter for digitally squaring the multi-frequency signal to produce a squared signal including a difference signal having a peak region in the frequency domain containing the difference frequency.

14. The optical sensing system as claimed in claim 1, wherein the first location has a given range of temperatures, and said temperature detecting means detects an initial difference frequency by searching for the difference frequency over a range of frequencies corresponding to the range of temperatures at the first location.

15. The optical sensing system as claimed in claim 1, wherein said temperature detecting means includes means for determining an initial difference frequency and means for tracking subsequent difference frequencies corresponding to variations in the temperature at the first location.

16. The optical sensing system as claimed in claim 1, further comprising shielding means for electromagnetically shielding said electro-optical means, said transducing means and said temperature detecting means.

17. The optical sensing system as claimed in claim 8, wherein said light guide means further includes a single optical fiber connected to said electro-optical means for receiving and transmitting the modulated optical signal.

18. The optical sensing system as claimed in claim 1, wherein said temperature detecting means comprises nonlinear means for squaring the multi-frequency signal and outputting a squared signal.

19. The optical sensing system as claimed in claim 1, wherein said temperature detecting means comprises:

signal generating means for generating an rf mixing signal; and mixing means having one input for receiving the rf mixing signal, a second input for receiving the multi-frequency signal and an output for producing a frequency shifted multi-frequency signal.

20. The optical sensing system as claimed in claim 1, wherein said temperature detecting means comprises a searching and tracking means for acquiring and updating the difference frequency.

21. A method for determining the temperature at a first location, comprising the steps of:

producing a chirped rf signal and a modulated optical signal having an envelope of modulation with a phase that is known with respect to the phase of the chirped rf signal;

transmitting the modulated optical signal along an optical path toward the first location;

producing a reference optical signal by reflecting a portion of the modulated optical signal;

receiving and guiding a remaining portion of said modulated optical signal within the first location;

producing a target optical signal by reflecting a part of the remaining portion of the modulated optical signal after the modulated optical signal passes through the first location;

receiving the chirped rf signal, the reference optical signal and the target optical signal, whereby the reference optical signal and the target optical signal have first and second time delays with respect to the chirped rf signal, respectively;

producing a multi-frequency electrical signal which includes a first frequency corresponding to the first time delay and a second frequency corresponding to the second time delay; and processing the multi-frequency electrical signal to determine a difference frequency corresponding to the difference between the first frequency and the second frequency and representing the temperature at said first location.

22. An optical sensing system for sensing the temperature at a first location, comprising:

electro-optical means for outputting a modulated optical signal and a chirped rf signal, the envelope of the modulated optical signal having a phase that has a known relation to the phase of the chirped rf signal;

fiber means coupled to said electro-optical means for receiving and transmitting the modulated optical, said fiber means having a first end and a second end, said first end receiving the modulated optical signal and transmitting said optical modulated optical signal toward said second end, said second end reflecting a portion of said modulated optical signal back towards said first end as a reference optical signal and transmitting a remaining portion of said modulated optical signal;

a reflector connected to a temperature sensing bi-metallic strip at said first location, said reflector being optically upstream from said fiber means for receiving said remaining portion of the modulated optical signal and reflecting said remaining portion of the modulated optical signal back toward said second end of the fiber means, said fiber means receiving and guiding said remaining portion of the modulated optical signal back towards said first end as a target optical signal;

transducing means, having an output and two inputs, one of the two inputs being electrically coupled to said electro-optical means for receiving the chirped rf signal and the other of the two inputs being optically coupled to said fiber means for receiving the reference optical signal and the target optical signal having first and second time delays with respect to the chirped rf signal, respectively, said transducing means producing at its output a multi-frequency electrical signal which includes a first frequency corresponding to the first time delay a second frequency corresponding to the second time delay; and temperature detecting means coupled to the output of said transducing means for processing the multi-frequency signal and determining a difference frequency corresponding to the difference between the first frequency and the second frequency and representing the temperature at said first location.

23. The optical sensing system as claimed in claim 22, wherein said bi-metallic strip is an S-shaped thermostat metal.

* * * * *